(12) United States Patent
Seo et al.

(10) Patent No.: US 8,927,630 B2
(45) Date of Patent: Jan. 6, 2015

(54) INORGANIC NANOFILLER, PARTIAL DISCHARGE RESISTANT ENAMELED WIRE INCLUDING THE SAME, AND PREPARING METHOD OF THE ENAMELED WIRE

(75) Inventors: Young-Soo Seo, Seoul (KR); Yongbeom Kim, Goyang-si (KR)

(73) Assignee: Sejong University Industry Academy Cooperation Foundation, Seoul (KR)

( * ) Notice: Subject to any disclaimer, the term of this patent is extended or adjusted under 35 U.S.C. 154(b) by 29 days.

(21) Appl. No.: 13/530,237

(22) Filed: Jun. 22, 2012

(65) Prior Publication Data

US 2013/0153263 A1 Jun. 20, 2013

(30) Foreign Application Priority Data

Dec. 20, 2011 (KR) .................. 10-2011-0138552
Jun. 21, 2012 (KR) .................. 10-2012-0066551

(51) Int. Cl.
*C07F 7/18* (2006.01)

(52) U.S. Cl.
USPC .......................................... 524/80

(58) Field of Classification Search
CPC .......... C07F 19/00; C07F 7/18; C08K 5/544; H01B 3/42
USPC .......................................... 524/80
See application file for complete search history.

(56) References Cited

U.S. PATENT DOCUMENTS

2006/0199890 A1* 9/2006 Fasulo et al. .................. 524/445
2010/0009185 A1* 1/2010 Fang et al. .................... 428/388

FOREIGN PATENT DOCUMENTS

| KR | 10-2001-0082627 | | 8/2001 |
| KR | 10-2006-0112594 | A | 11/2006 |
| KR | 10-0656867 | B1 | 12/2006 |
| KR | 10-0756903 | B1 | 9/2007 |
| KR | 10-2011-0043330 | A | 4/2011 |

OTHER PUBLICATIONS

English Translation of "Surface Modification of Nanoparticles for Enhancing Dispersion and Application to Nanocomposites", Yongbeom Kim, Graduate School of Sejong University, Aug. 11, 2011.*
Kim, et al., "Partial Discharge Resistant Silicapolyesterimide Nanocomposite Enameled Wire", Proceeding of the KIEEME Annual Summer Conference 2011, vol. 12, Jun. 22-24, 2011.
Kim, "Surface Modification of Nanoparticles for Enhancing Dispersion and Application to Nanocomposites", Sejong University, Aug. 11, 2011.

* cited by examiner

*Primary Examiner* — Ling Choi
*Assistant Examiner* — Lanee Reuther
(74) *Attorney, Agent, or Firm* — Pearne & Gordon LLP

(57) ABSTRACT

The present disclosure relates to a silane-containing inorganic nanofiller, a varnish including the silane-containing inorganic nanofiller, an enameled wire including the silane-containing inorganic nanofiller, and a method for preparing the enameled wire.

16 Claims, 26 Drawing Sheets

Content of the multiple surface functionalized inorganic nanofiller (wt%)

Content of the multiple surface functionalized inorganic nanofiller (wt%)

INORGANIC NANOFILLER, PARTIAL DISCHARGE RESISTANT ENAMELED WIRE INCLUDING THE SAME, AND PREPARING METHOD OF THE ENAMELED WIRE

CROSS-REFERENCE TO RELATED APPLICATION

This application claims the benefits of Korean Patent Application No. 10-2011-0138552 filed Dec. 20, 2011, and Korean Patent Application No. 10-2012-0066551 filed Jun. 21, 2012. The entire disclosure of the prior application is incorporated herein by reference in its entirety.

TECHNICAL FIELD

The present disclosure relates to a silane-containing inorganic nanofiller, a varnish including the silane-containing inorganic nanofiller, an enameled wire including the silane-containing inorganic nanofiller, and a method for preparing the enameled wire.

BACKGROUND ART

Partial discharges generally indicate all discharges that do not occur between electrodes. Such partial discharges cause electrical corrosion of an insulating material. For example, the partial discharges include a corona discharge that occurs near a pointed part of an electrode in a gas, a creeping discharge that occurs along a surface of a solid insulting material, and a void discharge that occurs in a void of an interior part or a surface of a solid insulating material.

The partial discharges may occur along an outer surface of an insulating material of an enameled wire. All the corona discharge, the creeping discharge, and the void discharge may occur depending on shapes of local parts of the insulating material of the enameled wire. The discharges are collectively called partial discharges or corona discharges in the art of the present disclosure. In most cases, the partial discharges occur due to an inverter surge applied to a motor controlled by a high-speed inverter including a pulse width modulation (PWM) method at an induction portion coil or an input terminal of the motor. The partial discharges destroy a polymer insulating layer of an enameled wire, which is a component of a coil. Further, the partial discharges cause shorts between neighboring wires and thereby disenabling the motor.

If the enameled wire has a polymer nanocomposite film on its skin, it is possible to accomplish high resistance against the partial discharges and to maintain mechanical and electrical properties such as electric insulation equal to those of a conventional enameled wire having only an organic polymer insulating film. In order to prepare the polymer nanocomposite, inorganic nanofillers need to be dispersed in a polymer matrix with high dispersibility. Since the partial discharges may be absorbed or reflected on surfaces of the inorganic nanofillers, the resistance against the partial discharges can be improved by enlarging the whole surface area of the inorganic nanofillers. If the inorganic nanofillers are condensed to form a cluster on the film of the enameled wire, electric fields converse on the portions where no inorganic nanofillers are distributed, or voids, so that the partial discharges cannot be prevented. Thus, the high dispersibility of the inorganic nanofillers should be maintained during all the processes for preparing the enameled wire.

In order to prepare a varnish in which the inorganic nanofillers are dispersed, for use in coating the enameled wire, three major methods have been conventionally used.

The first of the methods is a mechanically dispersing method, which directly disperses the inorganic nanofillers in the manner that the inorganic nanofillers are put in a polymer solution, and a strong shear force is applied thereto thereby mechanically homogenizing the condensation of the inorganic nanofillers. Since this method does not require chemical processing, preparing processes thereof are simple and inexpensive. However, if this method is used to disperse the inorganic nanofillers, it has been reported that there is a high possibility of occurrence of recondensation among the inorganic nanofillers, thus the dispersion stability is low. As a similar method, a colloidal solution is prepared in advance by monodispersing inorganic nanofillers that have not been subjected to surface-treating, in a certain organic solvent, and the colloidal solution is blended with a varnish. For example, Korean Patent Nos. 10-0756903 and 10-0656867 describes this method. However, this method has a limit in increasing a content of the inorganic nanofillers compared to polymer components. Accordingly, if a varnish in which the inorganic nanofillers are dispersed is prepared by the method and used for coating the enameled wire, satisfactory partial discharge resistance cannot be assigned to the enameled wire.

The second of the methods is a sol-gel method, which blends metal alkoxides such as tetraethoxysilicate with a varnish, and then, grows the inorganic nanofillers at a low temperature, or an in-situ polymerization method, which grows the inorganic nanofillers during processes for high temperature coating or heat processing. This method is advantageous in dispersing inorganic nanofillers in a relatively uniformed size. However, the electrical property of the enameled wire may be deteriorated after the enameled wire is coated due to unreacted metal alkoxides residual after reaction. Further, since reaction time is long, a speed of preparing processes is reduced, and thereby, increasing production costs.

The third of the methods relates to dispersing the inorganic nanofillers by performing surface-treating to the inorganic nanofillers with a silane coupling agent so as to enable the inorganic nanofillers to have affinity to a polymer solution. However, if this method is used, it is difficult to obtain satisfactory surface coverage of the silane coupling agent to the whole surfaces of the inorganic nanofillers. If complicated processes such as preparing and coating a varnish are performed by the surface-treating method that has been known to the present, the dispersibility of the inorganic nanofillers could not have been maintained.

DISCLOSURE OF THE INVENTION

Problems to be Solved by the Invention

An illustrative embodiment provides a silane-containing inorganic nanofiller including: an inorganic nanofiller; a first silane containing at least one aromatic cyclic group which is chemically bonded to a surface of the inorganic nanofiller; and a second silane containing at least one amine group which is chemically bonded to a surface of the inorganic nanofiller (hereinafter, the silane-containing inorganic nanofiller in accordance with a first aspect of the illustrative embodiment may be expressed as a "multiply surface-functionalized inorganic nanofiller", but the expression indicates the same material as the silane-containing inorganic nanofiller), a nanocomposite varnish including the silane-containing inorganic nanofiller, a partial discharge resistant enameled wire which has improved partial discharge resistance by having a film where the silane-containing inorganic nanofiller is uniformly]

dispersed in an organic insulating polymer matrix, and a method for preparing the partial discharge resistant enameled wire.

However, the problems sought to be solved by the present disclosure are not limited to the foregoing problems. Problems, which are sought to be solved by the present disclosure but are not described herein, can be clearly understood by those skilled in the art from the descriptions below.

Means for Solving the Problems

In accordance with a first aspect of the present disclosure, there is provided a silane-containing inorganic nanofiller, including: an inorganic nanofiller; a first silane containing at least one aromatic cyclic group which is chemically bonded to a surface of the inorganic nanofiller; and a second silane containing at least one amine group which is chemically bonded to a surface of the inorganic nanofiller.

In accordance with a second aspect of the present disclosure, there is provided a nanocomposite varnish, including: the silane-containing inorganic nanofiller of the first aspect; and a varnish for an enameled wire wherein the silane-containing inorganic nanofiller is dispersed.

In accordance with a third aspect of the present disclosure, there is provided a partial discharge resistant enameled wire, including: a conductive wire; and a film formed on the conductive wire, and containing an organic insulating polymeric matrix and the silane-containing inorganic nanofiller of the first aspect dispersed in the organic insulating polymeric matrix with a nanometer scale.

In accordance with a fourth aspect of the present disclosure, there is provided a method for preparing the partial discharge resistant enameled wire of the third aspect, including: adding an inorganic nanofiller, a first silane containing at least one aromatic cyclic group, and a second silane containing at least one amine group to a first solvent followed by irradiating an ultrasonic wave to form a silane-containing inorganic nanofiller; dispersing the silane-containing inorganic nanofiller in a second solvent to form a colloidal solution; dispersing the colloidal solution in a varnish for an enameled wire to form a nanocomposite varnish containing the silane-containing inorganic nanofiller; and coating the nanocomposite varnish on a conductive wire and drying and heat curing the nanocomposite varnish coated on the conductive wire to form a film containing the silane-containing inorganic nanofiller so as to obtain the partial discharge resistant enameled wire.

Effect of the Invention

In accordance with the illustrative embodiment, a varnish containing a multiply surface-functionalized inorganic nanofiller having high dispersibility is prepared. If the varnish is used to coat an enameled wire, a partial discharge resistant enameled wire capable of effectively preventing partial discharges can be prepared easily and economically.

In case of the varnish prepared for use in coating an enameled wire so as to prepare a partial discharge resistant enameled wire, the inorganic nanofiller needs to be dispersed uniformly and stably. Since the conventional methods that have been used to disperse the inorganic nanofiller have problems respectively, the methods need to be improved. Specifically, in case of the mechanically dispersing method, there are problems that the dispersion stability is low and there is a high possibility that recondensation of the inorganic nanofillers occurs. In case of the sol-gel method, there is a problem that the long reaction time causes high production costs. Further, if surface-treating to the inorganic nanofiller is performed by the conventional method, there is a problem that the dispersibility of the inorganic nanofiller cannot be maintained.

The multiply surface-functionalized inorganic nanofiller prepared in accordance with the illustrative embodiment has excellent dispersibility and dispersion stability compared to conventional inorganic nanofillers. If a varnish solution containing the multiply surface-functionalized inorganic nanofiller is prepared and used to prepare a partial discharge resistant enameled wire, the partial discharges applied to a surface of the enameled wire is absorbed or reflected, thereby, maximizing the effect in preventing the partial discharges.

Accordingly, if the partial discharge resistant enameled wire prepared in accordance with the illustrative embodiment is used as a component of electronic devices such as a motor, an inverter, and a transformer, life reduction resulting from deterioration caused by an inverter surge applied to the electronic devices can be prevented, so that the life of the electronic devices can be expanded.

BEST MODE FOR CARRYING OUT THE INVENTION

Figure 1:
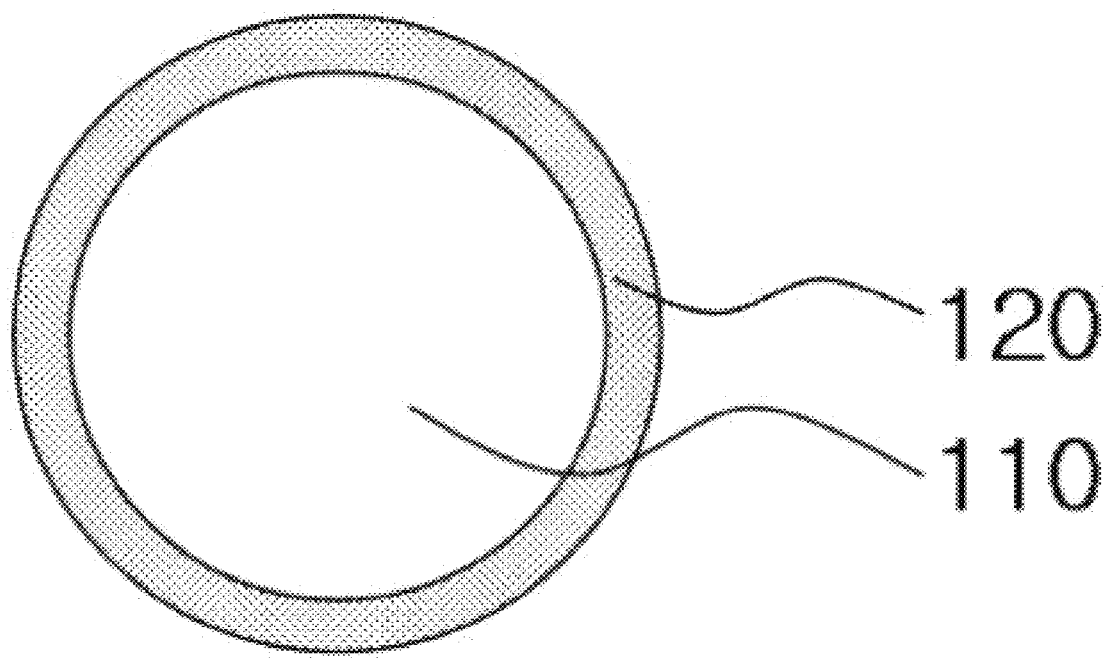
FIG. 1 is a cross-sectional view of a partial discharge resistant enameled wire in accordance with an illustrative embodiment of the present disclosure.

Hereinafter, illustrative embodiments will be described in detail by reference to the accompanying drawings so that the present disclosure may be readily implemented by those skilled in the art. However, it is to be noted that the present disclosure is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party. Through the whole document, the term "step of" does not mean "step for".

Through the whole document, the term "combination(s) of" included in Markush type description means mixture or combination of one or more components, steps, operations and/or elements selected from the group consisting of components, steps, operation and/or elements described in Markush type and thereby means that the disclosure includes one or more components, steps, operations and/or elements selected from the Markush group.

Through the whole document, the term "aromatic cyclic group" which can have a substituent each may include a phenyl group which can have a substituent, a benzyl group which can have a substituent, a toluoyl group which can have a substituent, a styrenyl group which can have a substituent, or a naphthalene group which can have a substituent. However, the illustrative embodiment is not limited thereto.

Through the whole document, the term, "amine" or "amine group," which is used solely or a part of another group, means —N, —NH, or —NH$_2$. The "amine" or the "amine group" may be substituted with one or two substituents, which may be identical to or different from each other, e.g., an alkyl group, an aryl group, an arylalkyl group, an alkenyl group, an alkynyl group, a heteroaryl group, a heteroarylalkyl group, a cycloheteroalkyl group, a cycloheteroalkylalkyl group, a cycloalkyl group, a cycloalkylalkyl group, a haloalkyl group, a hydroxyalkyl group, an alkoxyalkyl group, a thioalkyl group, a carbonyl group, or a carboxyl group. However, the illustrative embodiment is not limited thereto.

Through the whole document, the "alkyl" or the "alkyl group" may be an alkyl group, which is linear or branched, saturated or unsaturated, and has 1 to 10 carbons, e.g., an alkyl group having 1 carbon, or 2, 3, 4, 5, 6, 7, 8, 9, or carbons. For example, the "alkyl" and the "alkyl group" may include methyl, ethyl, propyl, butyl, pentyl, hexyl, hepsyl, octyl, nonyl, decyl, or isomers thereof. However, the illustrative embodiment is not limited thereto.

Through the whole document, the "silane" means silicon hydride presented as $Si_nH_{2n+2}$. The defined "silane" may include an inorganic compound, in which a hydrogen atom included in the above chemical formula is substituted with a substituent such as a hydrocarbon group. However, the illustrative embodiment is not limited thereto.

Through the whole document, the "varnish" forms a lustrous transparent film and means a substance containing a polymer component such as a natural or synthetic resin and a solvent as main components. The "varnish" may include a oil-based varnish, a spirit varnish, and etc. However, the illustrative embodiment is not limited thereto.

Through the whole document, the "multiply surface-functionalized inorganic nanofiller" means a surface functionalized inorganic nanofiller, which contains at least two types of silanes chemically bonded to the surface of the inorganic nanofiller. The silanes may include a silane containing at least one aromatic cyclic group, a silane containing at least one amine group, or a silane containing at least one hydrocarbon group. However, the illustrative embodiment is not limited thereto. For example, the silane-containing inorganic nanofiller in accordance with the first aspect of the illustrative embodiment may correspond to the multiply surface-functionalized inorganic nanofiller. However, the illustrative embodiment is not limited thereto. The multiply surface-functionalized inorganic nanofiller may contain additional silanes such as a third silane, in addition to a first silane and a second silane, such that the surface of the inorganic nanofiller is functionalized.

In accordance with a first aspect of the illustrative embodiment, there is provided a silane-containing inorganic nanofiller including: an organic nanofiller; a first silane containing at least one aromatic cyclic group which is chemically bonded to a surface of the inorganic nanofiller; and a second silane containing at least one amine group which is chemically bonded to a surface of the inorganic nanofiller.

In accordance with the illustrative embodiment, the silane-containing inorganic nanofiller may further include a third silane containing at least one hydrocarbon group having a number of carbon atoms of 1 to 3 which is chemically bonded to a surface of the inorganic nanofiller. However, the illustrative embodiment is not limited thereto.

In accordance with the illustrative embodiment, the inorganic nanofiller may include an inorganic compound selected from the group consisting of silica, titania, alumina, zirconia, yttria, a chrome oxide, a zinc oxide, an iron oxide, clay, and combinations thereof. However, the illustrative embodiment is not limited thereto. For example, the silica may be fumed silica, fused silica, precipitated silica, silica prepared by the sol-gel method, or colloidal silica. However, the illustrative embodiment is not limited thereto. For example, the titania may be a fumed titania, a fused titania, a precipitated titania, a titania prepared by the sol-gel method, or a colloidal titania. However, the illustrative embodiment is not limited thereto. For example, the alumina may be fumed alumina, fused alumina, precipitated alumina, alumina prepared by the sol-gel method, or colloidal alumina. However, the illustrative embodiment is not limited thereto.

For example, if the inorganic nanofiller is or a $SiO_2$-based inorganic nanofiller such as a silica or a plate-shaped or needle-shaped silicate, the inorganic nanofillers tend to be strongly interacted with one another due to hydrogen bond generated from hydroxyl groups on surfaces of the inorganic nanofillers. As such, the $SiO_2$-based inorganic nanofiller may be added to a varnish such as a coating substrate and a paint to increase viscosity effectively. However, the illustrative embodiment is not limited thereto. For example, the $SiO_2$-based inorganic nanofiller may be dispersed in a solution and blended in a varnish, or the nanofillers may be directly blended in a varnish, so as to increase viscosity. However, the illustrative embodiment is not limited thereto. The $SiO_2$-based inorganic nanofillers may also be effectively used to prepare the multiply surface-functionalized inorganic nanofiller of the illustrative embodiment. However, the illustrative embodiment is not limited thereto.

In accordance with the illustrative embodiment, the first silane may include a silane containing at least one aromatic cyclic group selected from the group consisting of trimethoxyphenylsilane, N-[3-(trimethoxysilyl)propyl]aniline, N-[3-(trimethoxysilyl)propyl]-n'-(4-vinylbenzyl)ethylenediamine, allylphenyldichlorosilane, aminophenyltrimethoxysilane, t-butylphenyldichlorosilane, p-(t-butyl)phenethyltrichlorosilane, 3,5-dimethoxyphenyltriethoxysilane, diphenyldiethoxysilane, diphenyldimethoxysilane, diphenylmethylethoxysilane, 3-(p-methoxyphenyl)propyltrichlorosilane, p-methoxyphenyltrimethoxysilane, phenethylmethyldichlorosilane, phenethyltrimethoxysilane, 3-phenoxypropyldimethylchlorosilane, 3-phenoxypropylmethyldichlorosilane, 3-phenoxypropyltrichlorosilane, phenyldimethylchlorosilane, phenyldimethylethoxysilane, phenylethyldichlorosilane, phenylmethyldichlorosilane, 1-phenyl-1-(methyldichlorosilyl)butane, phenylmethyldimethoxysilane, phenylmethyldiethoxysilane, (3-phenylpropyl)trichlorosilane, phenyltrichlorosilane, phenyltriethoxysilane, phenyltrimethoxysilane, triphenylchlorosilane, triphenylethoxysilane, (triphenylmethyl)methyldichlorosilane, and combinations thereof. However, the illustrative embodiment is not limited thereto.

In accordance with the illustrative embodiment, the second silane may include a silane containing at least one amine group selected from the group consisting of 3-[2-(2-aminoethylamino)ethylamino]propyltrimethoxysilane, N-[3-(trimethoxysilyl)propyl]ethylenediamine, (3-aminopropyl)trimethoxysilane, and combinations thereof. However, the illustrative embodiment is not limited thereto.

In accordance with the illustrative embodiment, the third silane may include a silane containing at least one hydrocarbon group having a number of carbon atoms of 1 to 3 selected from the group consisting of ethyltrimethoxysilane, methoxytrimethylsilane, ethoxytrimethylsilane, triethylchlorosilane, trimethylchlorosilane, and combinations thereof. However, the illustrative embodiment is not limited thereto.

For example, the silane-containing inorganic nanofiller may be in the form of nanoparticles. However, the illustrative embodiment is not limited thereto. For example, the inorganic nanofiller may be in a size of from about 1 nm to about 100 nm, from about 1 nm to about 90 nm, from about 1 nm to about 80 nm, from about 1 nm to about 70 nm, from about 1 nm to about 60 nm, from about 1 nm to about 50 nm, from about 1 nm to about 40 nm, from about 1 nm to about 30 nm, from about 5 nm to about 100 nm, from about 5 nm to about 90 nm, from about 5 nm to about 80 nm, from about 5 nm to about 70 nm, from about 5 nm to about 60 nm, from about 5 nm to about 50 nm, from about 5 nm to about 40 nm, or from about 5 nm to about 30 nm. However, the illustrative embodiment is not limited thereto.

For example, the silane-containing inorganic nanofiller may be an inorganic nanofiller in which additional silanes in addition to the first silane, the second silane, and the third silane are chemically bonded to the surface of the inorganic nanofiller. However, the illustrative embodiment is not limited thereto.

For example, the silane-containing inorganic nanofiller may be in the form of a particle, a gel, or liquid. However, the illustrative embodiment is not limited thereto.

In accordance with a second aspect of the illustrative embodiment, there is provided a nanocomposite varnish including: the silane-containing inorganic nanofiller of the first aspect of the illustrative embodiment; and a varnish for an enameled wire wherein the silane-containing inorganic nanofiller is dispersed.

The silane-containing inorganic nanofiller included in the nanocomposite varnish of the second aspect of the illustrative embodiment corresponds to the silane-containing inorganic nanofiller of the first aspect of the illustrative embodiment. Accordingly, all the embodiments and examples described in the first aspect of the illustrative embodiment may be applied to the second aspect of the illustrative embodiment. However, the illustrative embodiment may not be limited thereto.

In accordance with the illustrative embodiment, the varnish for the enameled wire may include a varnish selected from the group consisting of a polyester varnish, a polyesterimide varnish, a polyesteramide varnish, a polyesteramideimide varnish, a [tri(2-hydroxy ethyl)isocyanurate triacrylate]-polyesterimide varnish, a polyetherimide varnish, a polyamide varnish, a polyamideimide varnish, a polyimide varnish, a polyurethane varnish, a polyvinyl formal varnish, and combinations thereof. However, the illustrative embodiment is not limited thereto.

In accordance with a third aspect of the illustrative embodiment, there is provided a partial discharge resistant enameled wire including: a conductive wire; and a film formed on the conductive wire, and containing an organic insulating polymeric matrix and the silane-containing inorganic nanofiller of the first aspect of the illustrative embodiment, which is dispersed in the organic insulating polymeric matrix with a nanometer scale.

The silane-containing inorganic nanofiller included in the partial discharge resistant enameled wire of the third aspect of the illustrative embodiment corresponds to the silane-containing inorganic nanofiller of the first aspect of the illustrative embodiment. Accordingly, all the embodiments and examples described in the first aspect of the illustrative embodiment may be applied to the third aspect of the illustrative embodiment. However, the illustrative embodiment is not limited thereto.

In accordance with the illustrative embodiment, the organic insulating polymeric matrix may include a polymer selected from the group consisting of polyester, polyesterimide, polyesteramide, polyesteramideimide, (tri(2-hydroxy ethyl)isocyanurate triacrylate)-polyesterimide, polyetherimide, polyamide, polyamideimide, polyimide, polyurethane, polyvinyl formal, and combinations thereof. However, the illustrative embodiment is not limited thereto.

In accordance with the illustrative embodiment, the film may include form about 0.1 wt % to about 30 wt % of the silane-containing inorganic nanofiller. However, the illustrative embodiment is not limited thereto. For example, a content of the silane-containing inorganic nanofiller in the film may be from about 0.1 wt % to about 5 wt %, from about 0.1 wt % to about 10 wt %, from about 0.1 wt % to about 20 wt %, from about 0.1 wt % to about 30 wt %, from about 5 wt % to about 10 wt %, from about 5 wt % to about 20 wt %, from about 5 wt % to about 30 wt %, from about 10 wt % to about 20 wt %, from about 10 wt % to about 30 wt %, or from about 20 wt % to about 30 wt %. However, the illustrative embodiment is not limited thereto.

With respect to the third aspect of the illustrative embodiment, FIG. 1 is a cross-sectional view of the partial discharge resistant enameled wire in accordance with the illustrative embodiment, which is a single-coated type of an enameled wire. The partial discharge resistant enameled wire may include a conductive wire 110, a multiply surface-functionalized inorganic nanofiller, which is formed on the conductive wire, and a film 120 containing an organic insulating polymer. However, the illustrative embodiment is not limited thereto.

For example, the partial discharge resistant enameled wire of the third aspect of the illustrative embodiment may be a double- or multiple-coated type, other than the single-coated type in FIG. 1. However, the illustrative embodiment is not limited thereto.

For example, the partial discharge resistant enameled wire of the third aspect of the illustrative embodiment may be a rectangular type or a flat type, other than a circle type in FIG. 1. However, the illustrative embodiment is not limited thereto.

For example, for a thickness of the film included in the partial discharge resistant enameled wire of the third aspect of the illustrative embodiment, any thickness, which is generally applied in the art of the present disclosure, may be adopted. However, the illustrative embodiment is not limited thereto.

For example, the conductive wire included in the partial discharge resistant enameled wire of the third aspect of the illustrative embodiment may include a metal selected from the group consisting of copper, aluminum, nickel, gold, silver, and combinations thereof. However, the illustrative embodiment is not limited thereto.

In accordance with a fourth aspect of the illustrative embodiment, there is provided a method for preparing the partial discharge resistant enameled wire of the third aspect of the illustrative embodiment, including: adding an inorganic nanofiller, a first silane containing at least one aromatic cyclic group, and a second silane containing at least one amine group to a first solvent followed by irradiating an ultrasonic wave to form a silane-containing inorganic nanofiller; dispersing the silane-containing inorganic nanofiller in a second solvent to form a colloidal solution; dispersing the colloidal solution in a varnish for an enameled wire to form a nanocomposite varnish containing the silane-containing inorganic nanofiller; and coating the nanocomposite varnish on a conductive wire and drying and heat curing the nanocomposite varnish coated on the conductive wire to form a film containing the silane-containing inorganic nanofiller so as to obtain the partial discharge resistant enameled wire.

The fourth aspect of the illustrative embodiment relates to a method for preparing the partial discharge resistant enameled wire of the third aspect of the illustrative embodiment. The silane-containing inorganic nanofiller included in the preparing method of the fourth aspect of the illustrative embodiment corresponds to the silane-containing inorganic nanofiller of the first aspect of the illustrative embodiment. Accordingly, all the embodiments and examples described in the first to third aspects of the illustrative embodiment may be applied to the fourth aspect of the illustrative embodiment. However, the illustrative embodiment is not limited thereto.

For example, the silane-containing inorganic nanofiller included in the preparing method of the fourth aspect of the illustrative embodiment may be specially designed to have high dispersibility during the whole processes for preparing the partial discharge resistant enameled wire of the fourth aspect of the illustrative embodiment. However, the illustrative embodiment is not limited thereto.

For example, the first solvent may include a solvent selected from the group consisting of toluene, xylene, ethanol, methanol, cresol, water, acetone, cyclohexan, phenol, N-methylpyrolidone (NMP), glycolether, N,N-dimethylformamide (DMF), and combinations thereof. However, the illustrative embodiment is not limited thereto. For example, the first solvent may further include a diluent used to dilute the varnish for the enameled wire varnish. However, the illustrative embodiment is not limited thereto.

For example, the second solvent may include a solvent selected from the group consisting of toluene, xylene, ethanol, methanol, cresol, water, acetone, cyclohexan, phenol, N-methylpyrolidone, glycolether, N,N-dimethylformamide, and combinations thereof. However, the illustrative embodiment is not limited thereto. For example, the second solvent may further include a diluent used to dilute the varnish for the enameled wire. However, the illustrative embodiment is not limited thereto.

In accordance with the illustrative embodiment, adding a third silane containing at least one hydrocarbon group having a number of carbon atoms of 1 to 3 followed by irradiating an ultrasonic wave may further included to form the silane-containing inorganic nanofiller. However, the illustrative embodiment is not limited thereto.

In accordance with the illustrative embodiment, the inorganic nanofiller may include an inorganic compound selected from the group consisting of silica, titania, alumina, zirconia, yttria, a chrome oxide, a zinc oxide, an iron oxide, clay, and combinations thereof. However, the illustrative embodiment is not limited thereto.

In accordance with the illustrative embodiment, the first silane may include a silane containing at least one aromatic cyclic group selected from the group consisting of trimethoxyphenylsilane, N-[3-(trimethoxysilyl)propyl]aniline, N-[3-(trimethoxysilyl)propyl]-n'-(4-vinylbenzyl)ethylenediamine, allylphenyldichlorosilane, aminophenyltrimethoxysilane, t-butylphenyldichlorosilane, p-(t-butyl)phenethyltrichlorosilane, 3,5-dimethoxyphenyltriethoxysilane, diphenyldiethoxysilane, diphenyldimethoxysilane, diphenylmethylethoxysilane, 3-(p-methoxyphenyl)propyltrichlorosilane, p-methoxyphenyltrimethoxysilane, henethylmethyldichlorosilane, phenethyltrimethoxysilane, 3-phenoxypropyldimethylchlorosilane, 3-phenoxypropylmethyldichlorosilane, 3-phenoxypropyltrichlorosilane, phenyldimethylchlorosilane, phenyldimethylethoxysilane, phenylethyldichlorosilane, phenylmethyldichlorosilane, 1-phenyl-1-(methyldichlorosilyl)butane, phenylmethyldimethoxysilane, phenylmethyldiethoxysilane, (3-phenylpropyl)trichlorosilane, phenyltrichlorosilane, phenyltriethoxysilane, phenyltrimethoxysilane, triphenylchlorosilane, triphenylethoxysilane, (triphenylmethyl)methyldichlorosilane, and combinations thereof. However, the illustrative embodiment is not limited thereto.

In accordance with the illustrative embodiment, the second silane may include a silane containing at least one amine group selected from the group consisting of 3-[2-(2-aminoethylamino)ethylamino]propyltrimethoxysilane, N-[3-(trimethoxysilyl)propyl]ethylenediamine, (3-aminopropyl)trimethoxysilane, and combinations thereof. However, the illustrative embodiment is not limited thereto.

In accordance with the illustrative embodiment, the third silane may include a silane containing at least one hydrocarbon group having a number of carbon atoms of 1 to 3 selected from the group consisting of ethyltrimethoxysilane, methoxytrimethylsilane, ethoxytrimethylsilane, triethylchlorosilane, trimethylchlorosilane, and combinations thereof. However, the illustrative embodiment is not limited thereto.

In accordance with the illustrative embodiment, the varnish for the enameled wire may include a varnish selected from the group consisting of a polyester varnish, a polyesterimide varnish, a polyesteramide varnish, a polyesteramideimide varnish, a (tri(2-hydroxy ethyl)isocyanurate triacrylate)-polyesterimide varnish, a polyetherimide varnish, a polyamide varnish, a polyamideimide varnish, a polyimide varnish, a polyurethane varnish, a polyvinyl formal varnish, and combinations thereof. However, the illustrative embodiment is not limited thereto.

For example, the process of irradiating an ultrasonic wave, included in the method for preparing the partial discharge resistant enameled wire of the fourth aspect of the present disclosure, i.e., the ultrasonic wave processing may have an advantage in reducing required time compared to the conventional surface-treating using only heat and a solvent. However, the illustrative embodiment is not limited thereto. For example, the ultrasonic wave processing may reduce a surface-treating time required to secure surface coverage exhibiting satisfactory dispersibility to the varnish for the enameled wire. However, the illustrative embodiment is not limited thereto. For example, in case of using the conventional surface-treating process using only heat and a solvent, the surface-treating time required to secure the surface coverage exhibiting satisfactory dispersibility to the varnish for the enameled wire may be about 9 days. However, if the ultrasonic wave processing of the fourth aspect of the illustrative embodiment is used, the surface-treating time may be dramatically reduced to about 3 days in case of a bath ultrasonic wave and about 3.5 hours in case of a horn ultrasonic wave. However, the illustrative embodiment is not limited thereto.

The method for preparing the partial discharge resistant enameled wire of the fourth aspect of the illustrative embodiment may be started with dispersing the inorganic nanofiller in a proper solvent to form a colloidal solution. To the end, the preparing method may be performed in the following sequence: adding the inorganic nanofiller to the first solvent, adding the first and the second silanes to the first solvent, and then, irradiating an ultrasonic wave to form the multiply surface-functionalized inorganic nanofiller; and dispersing the multiply surface-functionalized inorganic nanofiller in the second solvent to form the colloidal solution. However, the illustrative embodiment is not limited thereto. Here, the colloidal solution may be easily blended with the varnish for the enameled wire in follow-up processes. However, the illustrative embodiment is not limited thereto. The first and second solvents used to form the colloidal solution, respectively, may disperse the inorganic nanofiller uniformly and may not adversely affect the heat curing process for the nanocomposite varnish. However, the illustrative embodiment is not limited thereto.

The method for preparing the partial discharge resistant enameled wire of the fourth aspect of the illustrative embodiment may include dispersing the colloidal solution in the varnish for the enameled wire to form the nanocomposite varnish containing the inorganic nanofiller, after the process for forming the colloidal solution. However, the illustrative embodiment is not limited thereto. For example, as the varnish for the enameled wire, a polyester varnish or a polyesterimide varnish, which has high utilizability in the art of the present disclosure, may be used. However, the illustrative embodiment is not limited thereto. Main components of the varnish are a polymer component such as prepolymer, which is a type of oligomer with several or tens of monomers being bonded, and a solvent such as cresol or xylene. In general, the prepolymer has a linear chemical structure containing an aromatic cyclic group. However, the illustrative embodiment is not limited thereto. For example, ester prepolymer contained in the polyester varnish is almost nonpolar. However, since the ester prepolymer partially contains a hydroxyl group, the ester prepolymer is not strongly non-polar. Meanwhile, for example, since esterimide prepolymer contained in the polyesterimide varnish contains an amine group, the esterimide prepolymer has strong polarity. And, cresol, which is used as a solvent included in the varnish, has strong polarity, whereas xylene is non-polar. In order to enable the multiply surface-functionalized inorganic nanofiller to have high dispersibility in the varnish containing the various chemical materials having various polarity, the multiply surface-functionalized inorganic nanofiller should be interacted with each of the various chemical materials. Accordingly, by using the multiply surface-functionalized inorganic nanofiller of the first aspect of the illustrative embodiment, in which organic materials are chemically bonded to the surface of the inorganic nanofiller, the organic materials including the first silane containing an aromatic cyclic group, which can be strongly interacted with prepolymer and xylene among the various chemical materials, and the second silane containing at least one amine group which can be strongly interacted with cresol among the various chemical materials, the inorganic nanofiller may have high dispersibility in the varnish. That is, the inorganic nanofiller of the first aspect of the illustrative embodiment has high dispersibility in the varnish and may be used effectively in the "process for dispersing the colloidal solution in the varnish for the enameled wire to form the nanocomposite varnish containing the silane-containing inorganic nanofiller" with respect to the preparing method in accordance with the fourth aspect of the illustrative embodiment. However, the illustrative embodiment is not limited thereto.

The method for preparing the partial discharge resistant enameled wire of the fourth aspect of the illustrative embodiment may include coating, drying, and heat curing the nanocompoite varnish on a conductive wire, after performing the process of forming the nanocomposite varnish, to form a film containing the inorganic nanofiller and finally form the partial discharge resistant enameled wire of the third aspect of the present disclosure. However, the illustrative embodiment is not limited thereto. For example, drying and heat curing the nanocomposite varnish may be performed by applying strong heat of from about 350° C. to 550° C. so that rapid drying of the solvent and heat curing of the nanocomposite varnish are simultaneously performed. However, the illustrative embodiment is not limited thereto. For example, xylene having low evaporation point is first volatilized in the drying process, so that a peripheral environment of the inorganic nanofiller is rapidly polarized. Simultaneously, the dispersibility of the inorganic nanofiller may be reduced due to peripheral rapid thermal movement generated by the heat. However, since the multiply surface-functionalized inorganic nanofiller in accordance with the first aspect of the illustrative embodiment has a polar amine group which is chemically bonded to the surface of the inorganic nanofiller, the high dispersibility is maintained even when a severe change is applied to the peripheral environment. After xylene is volatilized, cresol having a higher evaporation point than that of xylene is volatilized, so that the peripheral environment of the inorganic nanofiller may be non-polarized. However, the multiply surface-functionalized inorganic nanofiller of the first aspect of the illustrative embodiment has an aromatic cyclic group which is chemically bonded to the surface of the inorganic nanofiller, and the aromatic cyclic group and an aromatic cyclic group of the prepolymer may be strongly interacted with each other through $\pi$-$\pi$ interaction. Accordingly, in this case, the high dispersibility can also be maintained. If the varnish is a polyester varnish, and the third silane is further bonded to the surface of the multiply surface-functionalized inorganic nanofiller of the first aspect of the illustrative embodiment, a hydrophobic short hydrocarbon group of the third silane suppresses attraction between the inorganic nanofillers resulting from the hydroxyl group present on the surface of the inorganic nanofiller. Simultaneously, the dispersibility of the inorganic nanofiller may be further improved by enhancing the hydrophobic interaction. However, the illustrative embodiment is not limited thereto. During the heat curing process in the preparing method of the fourth aspect of the illustrative embodiment, the solvent is almost volatilized so that there is left only prepolymer around the inorganic nanofiller. When the temperature begins to increase, prepolymer is cross-linked so that the interaction between prepolymer and the inorganic nanofiller becomes stronger compared to that in the previous processes. In this case, the peripheral environment of the inorganic nanofiller may become more hydrophobic compared to that in the previous processes, the viscosity may become stronger, and the thermal movement by heat may be intensively applied to the inorganic nanofiller. When the heat curing process is finished, the inorganic nanofiller, in which the aromatic cyclic group is chemically bonded to the surface of the inorganic nanofiller, is positioned between polymeric chains growing in the form of a polymer having a higher molecular weight. The aromatic cyclic group of the inorganic nanofiller is strongly interacted with the aromatic cyclic group of the polymeric chains so that the position of the inorganic nanofiller is finally fixed. Accordingly, the high dispersibility of the inorganic nanofiller can be maintained in the finally formed matrix.

In sum, the multiply surface-functionalized inorganic nanofiller of the first aspect of the illustrative embodiment can maintain high dispersibility during all the processes included in the method for preparing the partial discharge resistant enameled wire of the fourth aspect of the illustrative embodiment.

Hereinafter, the illustrative embodiment will be described in more detail with reference to examples and drawings. However, the illustrative embodiment is not limited thereto.

EXAMPLES

Example 1

Preparation of the Polyesterimide Partial Discharge Resistant Enameled Wire

Fumed silica of Sigma-Aldrich of about 12 g which had an average size of about 11 nm, and toluene of about 600 ml, as an inorganic nanofiller and a solvent respectively, were put into a glass bottle of about 1 l. The glass bottle was positioned in a bath ultrasonic wave machine filled with water of about 85° C. and having about 100 W and about 40 kHz standards, and an ultrasonic wave was applied thereto for about 30 minutes. Subsequently, (3-anilopropyl)trimethoxysilane of about 8 ml was injected as the first silane into the glass bottle, and heat of about 85° C. and an ultrasonic wave were applied thereto for about 10 minutes. Subsequently, N-(2-aminoethyl)-3-(trimethoxysilyl) propylamine of about 2 ml is injected as a second silane into the glass bottle, and heat of about 85° C. and an ultrasonic wave were applied thereto for about 3 days. As a result, the multiply surface-functionalized inorganic nanofiller was formed in the state of being contained in a solution.

Since the multiply surface-functionalized inorganic nanofiller was present in a solution, in order to remove unreacted silanes, ethanol of about 200 ml was injected into the glass bottle and blended therein. Thereafter, the contents of the glass bottle were poured into a glass filter funnel and washed. The washing process was carried out by performing spraying water, ethanol, methanol, acetone, or others to the solids on the filter, through which the contents had been filtered, three or more times. The washed solids were put into a convection drier oven to be dried at about 110° C. for about 12 hours so that powders of the multiply surface-functionalized inorganic nanofiller are formed.

A diluent for a polyesterimide varnish was added such that the powders of the inorganic nanofiller had a concentration of about 20 wt %. Heat of about 85° C. and an ultrasonic wave were applied thereto for about 8 hours to disperse the powders, so that a high-concentration silica colloidal solution was obtained. The silica colloidal solution was blended with a polyesterimide varnish of the KEI 200-39KM model of KOMEC, in which a content of solids was about 39 wt %, so that the nanocomposite varnish was formed. In this case, the multiply surface-functionalized inorganic nanofiller was adjusted to be about 1 wt %, about 3 wt %, about 5 wt %, about 10 wt %, about 15 wt %, and about 20 wt % compared with the whole solids of the nanocomposite varnish. Here, a content of the solids of the nanocomposite varnish was about 35 wt %.

Subsequently, among the nanocomposite varnishes, the nanocomposite varnish in which the content of the multiply surface-functionalized inorganic nanofiller was about 5 wt %, and the nanocomposite varnish in which the content of the multiply surface-functionalized inorganic nanofiller was about 10 wt %, were coated on a copper wire having an about 0.500 mm diameter at a furnace for an enameled wire 8 times. The varnishes were dried and heat cured, thereby forming a film. As a result, the polyesterimide partial discharge resistant enameled wire of Example 1 was prepared.

Comparative Example 1

Preparation of the Polyesterimide Enameled Wire

A polyesterimide varnish of the KEI 200-39KM model of KOMEC in which a content of solids was about 39 wt %, was prepared. A diluent for a polyesterimide varnish was blended with the varnish to slightly dilute the varnish such that a content of the solids was about 35 wt %. Subsequently, the diluted varnish was coated on a copper enameled wire of about 0.500 mm at a furnace for an enameled wire 8 times. The varnish was dried and heat cured, so that the polyesterimide enameled wire of Comparative Example 1 was prepared.

Example 2

Preparation of the Polyester Partial Discharge Resistant Enameled Wire

Fumed silica of Sigma-Aldrich of about 12 g which had an average size of about 11 nm, and toluene of about 600 ml, as an inorganic nanofiller and a solvent respectively, were put into a glass bottle of about 1 l. The glass bottle was positioned in a bath ultrasonic wave machine filled with water of about 85° C. and having about 100 W and about 40 kHz standards, and an ultrasonic wave was applied thereto for about 30 minutes. Subsequently, (3-anilopropyl)trimethoxysilane of about 8 ml was injected as the first silane into the glass bottle, and heat of about 85° C. and an ultrasonic wave were applied thereto for about 10 minutes. Subsequently, N-(2-aminoethyl)-3-(trimethoxysilyl) propylamine of about 2 ml was injected as the second silane into the glass bottle, and heat of about 85° C. and an ultrasonic wave were applied for about 3 hours. Subsequently, methoxytrimethylsilane of about 6 ml was further injected as the third silane into the glass bottle, and heat of about 85° C. and an ultrasonic wave were applied thereto for about 3 days. As a result, the multiply surface-functionalized inorganic nanofiller was formed in the state of being contained in a solution.

Since the multiply surface-functionalized inorganic nanofiller was present in a solution, in order to remove unreacted silanes, ethanol of about 200 ml was injected into the glass bottle and blended therein. Thereafter, the contents of the glass bottle were poured into a glass filter funnel and washed. The washing process was carried out by performing spraying water, ethanol, methanol, acetone, or others to the solids on the filter, through which the contents had been filtered, three or more times. The washed solids were put into a convection drier oven to be dried at about 110° C. for about 12 hours so that powders of the multiply surface-functionalized inorganic nanofiller were formed.

A diluent for a polyesterimide varnish was added such that the powders of the inorganic nanofiller had a concentration of about 20 wt %. Heat of about 85° C. and an ultrasonic wave were applied thereto for about 8 hours to disperse the powders of the inorganic nanofiller, so that a high-concentration silica colloidal solution was formed. The silica colloidal solution was blended with a polyesterimide varnish of the HISTER HE320 model of Shinhan Chemical System, in which a content of solids was about 40 wt %, so that the nanocomposite varnish was formed. In this case, the multiply surface-functionalized inorganic nanofiller was adjusted to be about 1 wt %, about 3 wt %, about 5 wt %, about 10 wt %, about 15 wt %, and about 20 wt % compared with the whole solids of the nanocomposite varnish.

Subsequently, among the nanocomposite varnishes, the nanocomposite varnish, in which a content of the multiply surface-functionalized inorganic nanofiller was about 1 wt %, was coated on a copper wire having an about 1.00 mm diameter at a furnace for an enameled wire 9 times. The varnish was dried and heat cured, thereby, forming a film. As a result, the polyester partial discharge resistant enameled wire of Example 2 was prepared.

Comparative Example 2

Preparation of the Polyester Enameled Wire

A polyester varnish of the HISTER HE320 model of Shinhan Chemical System, in which a content of solids was about 40 wt %, was prepared. Subsequently, the varnish was coated on a copper enameled wire of about 1.00 mm at a furnace for an enameled wire 9 times. The varnish is dried and heat cured, so that the polyester enameled wire of Comparative Example 2 is prepared.

Example 3

Preparation of the Multiply Surface-Functionalized Inorganic Nanofiller Using a Horn Ultrasonic Wave Machine The multiply surface-functionalized inorganic nanofiller of Example 3 using the horn ultrasonic wave machine was similar to the multiply surface-functionalized inorganic nanofiller of Example 1. However, the multiply surface-functionalized inorganic nanofiller of Example 3 was different from the multiply surface-functionalized inorganic nanofiller of Example 1 in that Example 3 used the horn ultrasonic wave machine during the surface modifying process.

First, fumed silica of Sigma-Aldrich of about 12 g which had an average size of about 11 nm, and toluene of about 600 ml, as an inorganic nanofiller and a solvent, respectively, were put into a glass bottle of about 1l. The glass bottle was positioned in a both filled with water of about 85° C., and an ultrasonic wave corresponding to a half of a maximum output was applied thereto for about 30 minutes by using the horn ultrasonic wave machine of Janosonic having about 400 W and about 20 kHz standards. The conditions for a temperature and an ultrasonic wave were still maintained during the following reaction. Subsequently, (3-anilopropyl)trimethoxysilane of about 8 ml was injected as the first silane into the glass bottle. Subsequently, after about 10 minutes, N-(2-aminoethyl)-3-(trimethoxysilyl)propylamine of about 2 ml was injected as the second silane into the glass bottle. The reaction was finished after about 3.5 hours, so that the multiply surface-functionalized inorganic nanofiller was formed in the state of being contained in a solution.

Since the multiply surface-functionalized inorganic nanofiller was present in a solution, in order to remove unreacted silanes, ethanol of about 200 ml was injected into the glass bottle and blended therein. Thereafter, the contents of the glass bottle were poured into a glass filter funnel and washed. The washing process was carried out by performing spraying water, ethanol, methanol, acetone, or others to the solids on the filter, through which the contents had been filtered, three or more times. The washed solids were put into a convection drier oven to be dried at about 110° C. for about 12 hours so that powders of the multiply surface-functionalized inorganic nanofiller were formed.

Comparative Example 3

Preparation of the Inorganic Nanofiller, which has been Surface Modified Using Only One Type of a Silane, and the Nanocomposite Varnish Fumed silica of Sigma-Aldrich of about 12 g which had an average size of 11 nm, and toluene of about 600 ml, as an inorganic nanofiller and a solvent, respectively, were put into a glass bottle of about 1l. The glass bottle was positioned in a bath ultrasonic wave machine filled with water of about 85° C. and having about 100 W and about 40 kHz standards, and an ultrasonic wave was applied thereto for about 30 minutes. Subsequently, (3-anilopropyl)trimethoxysilane of about 8 ml was injected into the glass bottle, and heat of about 85° C. and an ultrasonic wave were applied thereto for about 3 days so that the inorganic nanofiller, which was surface modified using only one type of a silane, was formed in the state of being contained in a solution.

Since the inorganic nanofiller, which was surface modified using only one type of a silane, was present in a solution, in order to remove unreacted silanes, ethanol of about 200 ml was put into the glass bottle. The contents of the glass bottle were poured into a glass filter funnel and washed. The washing process was carried out by performing spraying water, ethanol, methanol, acetone, or others to the solids on the filter, through which the contents had been filtered, three or more times. The washed solids were put into a convection drier oven to be dried at about 110° C. for about 12 hours so that powders of the surface modified inorganic nanofiller were formed.

A diluent for a polyesterimide varnish was added such that the powders had a concentration of about 20 wt %. Heat of about 85° C. and an ultrasonic wave were applied thereto for about 8 hours to disperse the powders, so that a high-concentration silica colloidal solution was formed. The silica colloidal solution was blended with a polyesterimide varnish of the HISTER HE320 model of Shinhan Chemical System, in which a content of solids was about 40 wt %, and heat of about 85° C. and an ultrasonic wave were further applied for about 24 hours so that the nanocomposite varnish was formed. In this case, the inorganic nanofiller, which was surface modified using only one type of a silane, was adjusted to be about 1.0 wt % compared to the whole solids of the nanocomposite varnish.

Comparative Example 4

Preparation of the Nanocomposite Varnish Containing an Inorganic Nanofiller

Fumed silica of Sigma-Aldrich which had an average size of 11 nm as an inorganic nanofiller was put into a glass bottle of about 1l. And a diluent for a polyesterimide varnish was added such that the powders had a concentration of about 5 wt %. Heat of about 85° C. and an ultrasonic wave were applied thereto for about 48 hours to disperse the powders, so that a silica colloidal solution was formed. The silica colloidal solution was blended with a polyester varnish of the HISTER HE320 model of Shinhan Chemical System, in which a content of solids was about 40 wt %, and heat of about 85° C. and an ultrasonic wave were further applied thereto for about 24 hours so that a nanocomposite varnish was formed. In this case, the inorganic nanofiller was adjusted to be about 1.0 wt % compared to the whole solids of the nanocomposite varnish.

<Analysis>

The inorganic nanofiller, the nanocomposite varnish containing the inorganic nanofiller, and the enameled wire containing the inorganic nanofiller, which had been prepared in Examples 1 to 3 and Comparative Examples 1 to 4, was analyzed with reference to the drawings of the present disclosure.

Figure 2A:
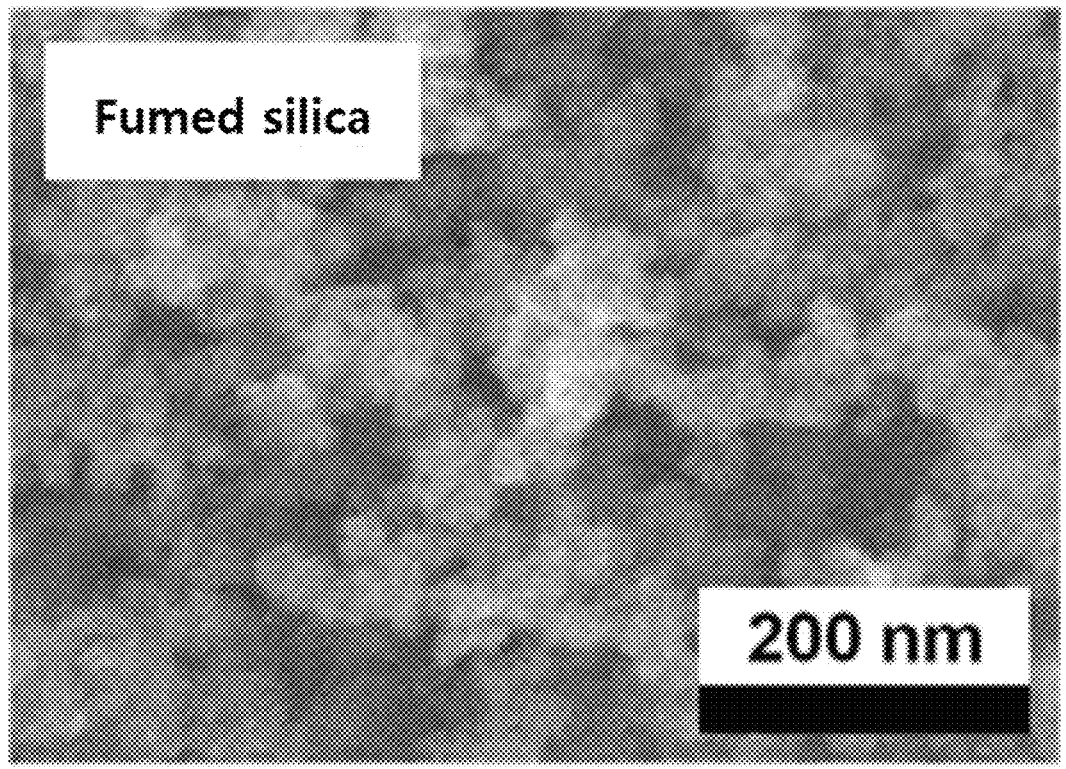
FIG. 2a is a SEM image of fumed silica.
Figure 2B:
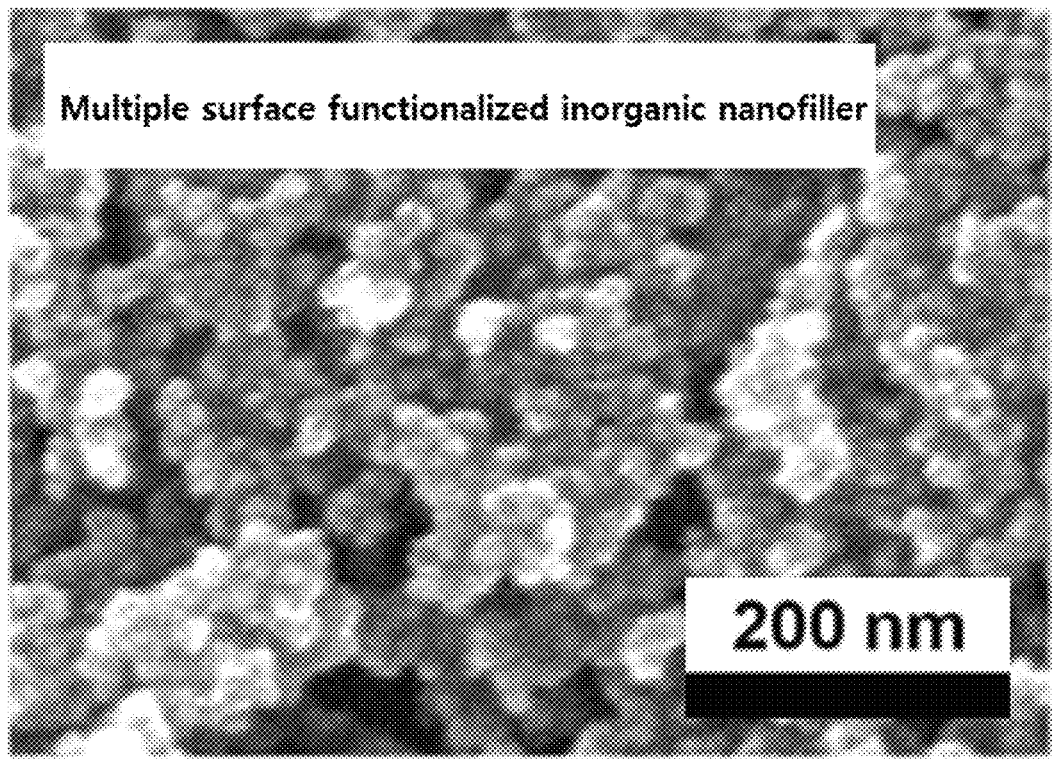
FIG. 2b is a SEM image of a multiply surface-functionalized inorganic nanofiller in accordance with Example 1 of the present disclosure.

First, FIG. 2a is a SEM image of fumed silica, and FIG. 2b is a SEM image of the multiply surface-functionalized inorganic nanofiller of Example 1. For the scanning electron microscope (SEM), FE-SEM of the S-4700 model of Hitachi was used. In FIGS. 2a and 2b, it was observed that the average diameter of the fumed silica was about 11 nm, and the average diameter of the multiply surface-functionalized inorganic nanofiller was increased by about 2 nm to about 5 nm compared to that of the fumed silica.

Figure 3:
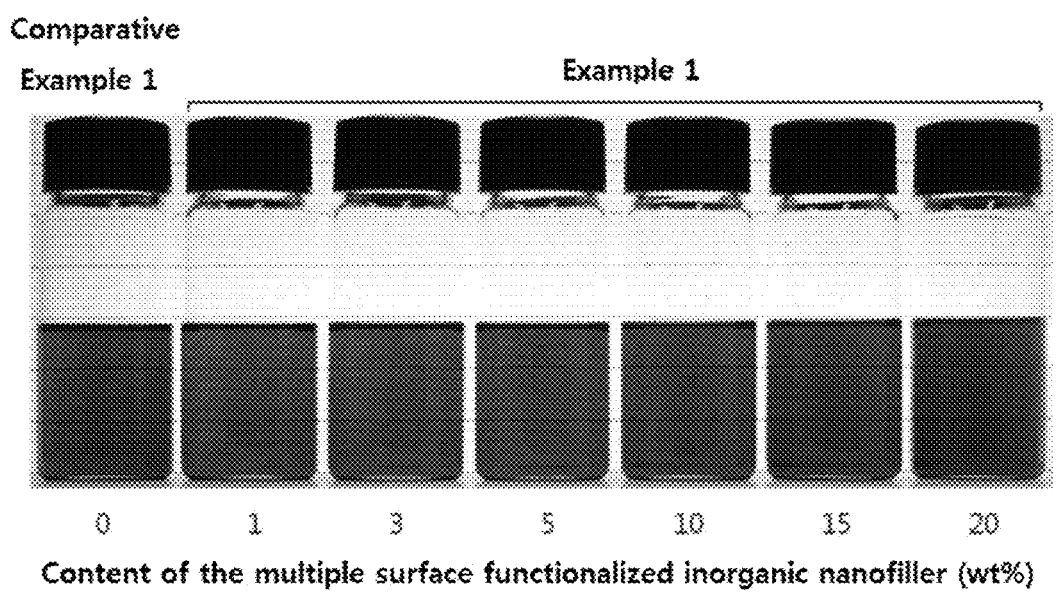
FIG. 3 is a photograph showing a polyesterimide varnish in accordance with Comparative Example 1 of the present disclosure, and a polyesterimide nanocomposite varnish in accordance with Example 1 of the present disclosure, in which a content of the multiply surface-functionalized inorganic nanofiller is 1, 3, 5, 10, 15, and 20 wt % compared to solids.

FIG. 3 is a photograph showing the polyesterimide varnish of Comparative Example 1, and the polyesterimide nanocomposite varnish of Example 1, in which a content of the multiply surface-functionalized inorganic nanofiller is 1, 3, 5, 10, 15, and 20 wt %. From the photograph of FIG. 3, it was identified that the multiply surface-functionalized inorganic nanofiller was dispersed well in the polyesterimide varnish and had high transparency. However, as the amount of the multiply surface-functionalized inorganic nanofiller increased, the transparency was slightly reduced.

Figure 4:
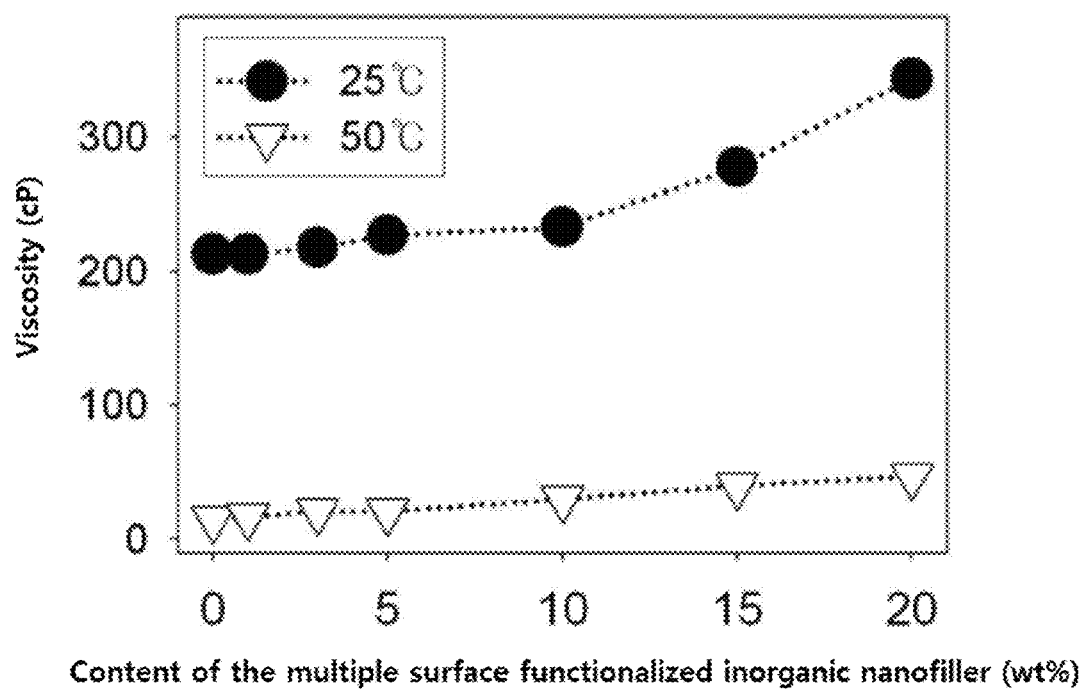
FIG. 4 is a viscosity graph for the polyesterimide varnish in accordance with Comparative Example 1 of the present disclosure, and the polyesterimide nanocomposite varnish in accordance with Example 1 of the present disclosure, in which a content of the multiply surface-functionalized inorganic nanofiller is 1, 3, 5, 10, 15, and 20 wt % compared to solids.

FIG. 4 is a viscosity graph for the polyesterimide varnish of Comparative Example 1 and the polyesterimide nanocomposite varnish of Example 1 in which a content of the multiply surface-functionalized inorganic nanofiller is 1, 3, 5, 10, 15, and 20 wt %. In order to measure the viscosity, the viscometer of the LV DV-E model of Brookfield was used. As shown in FIG. 4, in Comparative Example 1 in which the content of the multiply surface-functionalized inorganic nanofiller was 0 wt %, and Example 1 in which the content of the multiply surface-functionalized inorganic nanofiller was 1, 3, 5, 10, 15, and 20 wt %, the viscosity at 25° C. is 213, 213, 218, 227, 233, 278, and 344 cP (centipoises), and the viscosity at 50° C. was 15, 17, 21, 21, 30, 40, and 47 cP. At 25° C., the increase of the viscosity was small even until the content of the multiply surface-functionalized inorganic nanofiller reached 10 wt %. The viscosity slightly increased after the content reached at least 15 wt %. By the results of FIG. 4, it was confirmed that the interaction between the inorganic nanofiller and the peripheral environment thereof was stronger than that between the inorganic nanofillers, so that the condensation of the inorganic nanofillers was prevented effectively. However, as the content of the multiply surface-functionalized inorganic nanofiller increased, thereby increasing the number of the inorganic nanofillers, the proportion of the inorganic nanofillers in the whole volume also increased. Accordingly, the interaction between the inorganic nanofillers also became relatively strong. Eventually, by the results of FIG. 4, it was confirmed that the multiply surface-functionalized inorganic nanofiller was dispersed effectively in the polyseterimide varnish.

Figure 5:
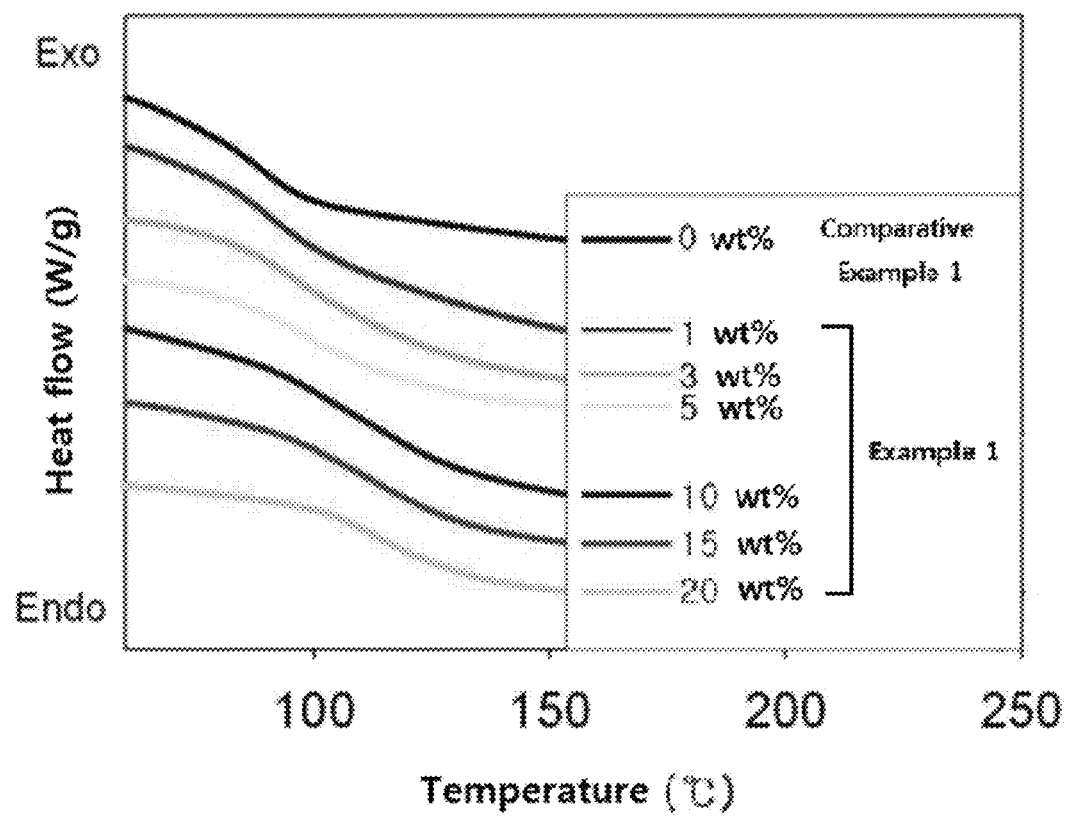
FIG. 5 is a temperature-heat flow graph obtained by using a differential scanning calorimetry after heat curing the polyesterimide varnish in accordance with Comparative Example 1 of the present disclosure, and the polyesterimide nanocomposite varnish in accordance with Example 1 of the present disclosure, in which a content of the multiply surface-functionalized inorganic nanofiller is 1, 3, 5, 10, 15, and 20 wt % compared to solids.

FIG. 5 is a temperature-heat flow graph obtained by using a differential scanning calorimetry, after performing heat curing to the polyesterimide varnish of Comparative Example 1 and the polyesterimide nanocomposite varnish of Example 1, in which a content of the multiply surface-functionalized inorganic nanofiller is 1, 3, 5, 10, 15, and 20 wt %. For the differential scanning calorimetry, the DSC1 model of Mettler-Toledo was used.

Figure 6:
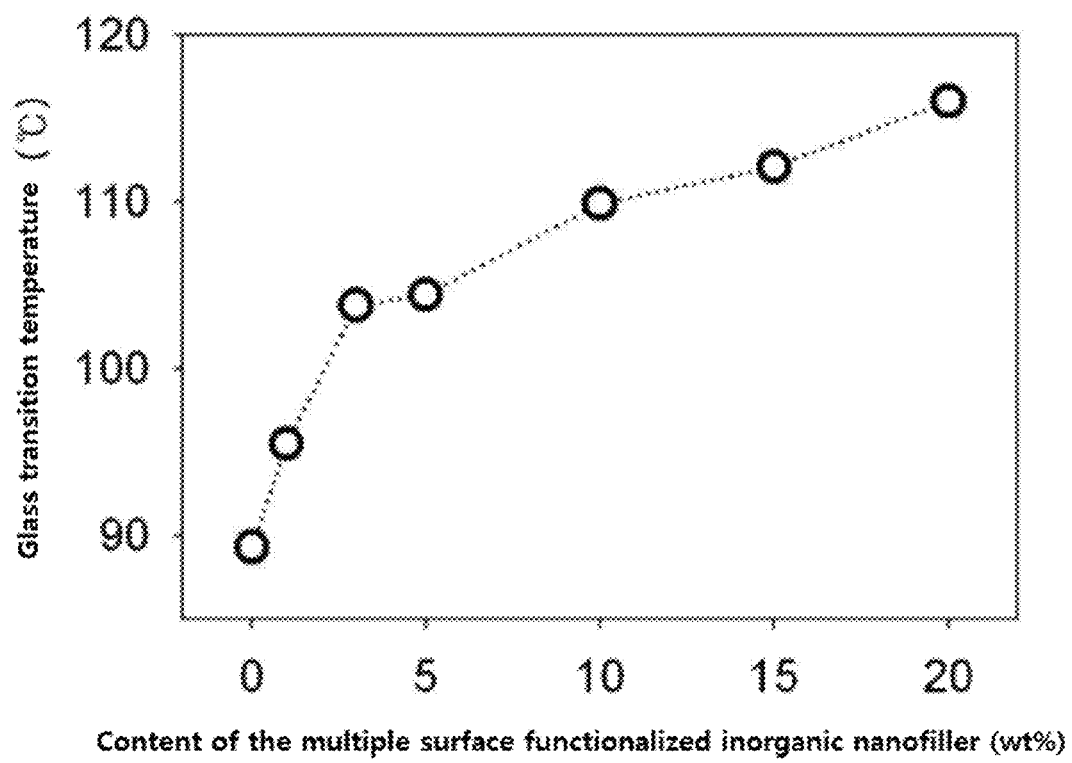
FIG. 6 is a content of the multiply surface-functionalized inorganic nanofiller-glass transition temperature graph, which is obtained from the temperature-heat flow graph of FIG. 5.

FIG. 6 is a content of the multiply surface-functionalized inorganic nanofiller-glass transition temperature graph, which is obtained from the temperature-heat flow graph in FIG. 5. In this regard, Table 1 below shows a glass transition onset point, a glass transition termination point, and a glass transition temperature ($T_g$) that is an average value of the onset point and the termination point, as presented in FIGS. 5 and 6.

TABLE 1

| | Glass transition onset point (° C.) | Glass transition termination point (° C.) | Glass transition temperature ($T_g$, ° C.) |
|---|---|---|---|
| Comparative Example 1 (0 wt %) | 79.2 | 99.5 | 89.4 |
| Example 1 (1 wt %) | 78.6 | 112.4 | 95.5 |
| Example 1 (3 wt %) | 83.3 | 124.3 | 103.8 |
| Example 1 (5 wt %) | 85.6 | 123.3 | 104.5 |
| Example 1 (10 wt %) | 88.2 | 131.6 | 109.9 |
| Example 1 | 92.6 | 131.6 | 112.1 |

TABLE 1-continued

| | Glass transition onset point (° C.) | Glass transition termination point (° C.) | Glass transition temperature ($T_g$, ° C.) |
|---|---|---|---|
| (15 wt %) | | | |
| Example 1 (20 wt %) | 100.8 | 131.3 | 116.1 |

As shown in FIGS. 5, 6, and Table 1 above, the glass transition temperature of the multiply surface-functionalized inorganic nanofiller increased proportionally with the increase of the amount of the multiply surface-functionalized inorganic nanofiller to be added. The temperature of the glass transition onset point, at which the inclination of the heat flow graph begins to vary, also gradually increased. Especially, there was rapid increase of the glass transition temperature until Example 1 (3 wt %) of Table 1 above. That is, when heat was applied to the nanocomposite, as the content of the multiply surface-functionalized inorganic nanofiller was high, the movement of the polymer was restricted so that the effect in increasing the glass transition temperature was achieved. The effect appeared to be strongly imparted until the content of the inorganic nanofiller reached 3 wt %. The effect was linearly shown even when the content of the inorganic nanofiller was more than 5 wt %. The effect showed that the dispersibility of the multiply surface-functionalized inorganic nanofiller was excellent in the polyesterimide insulting polymer matrix.

Figure 7A:
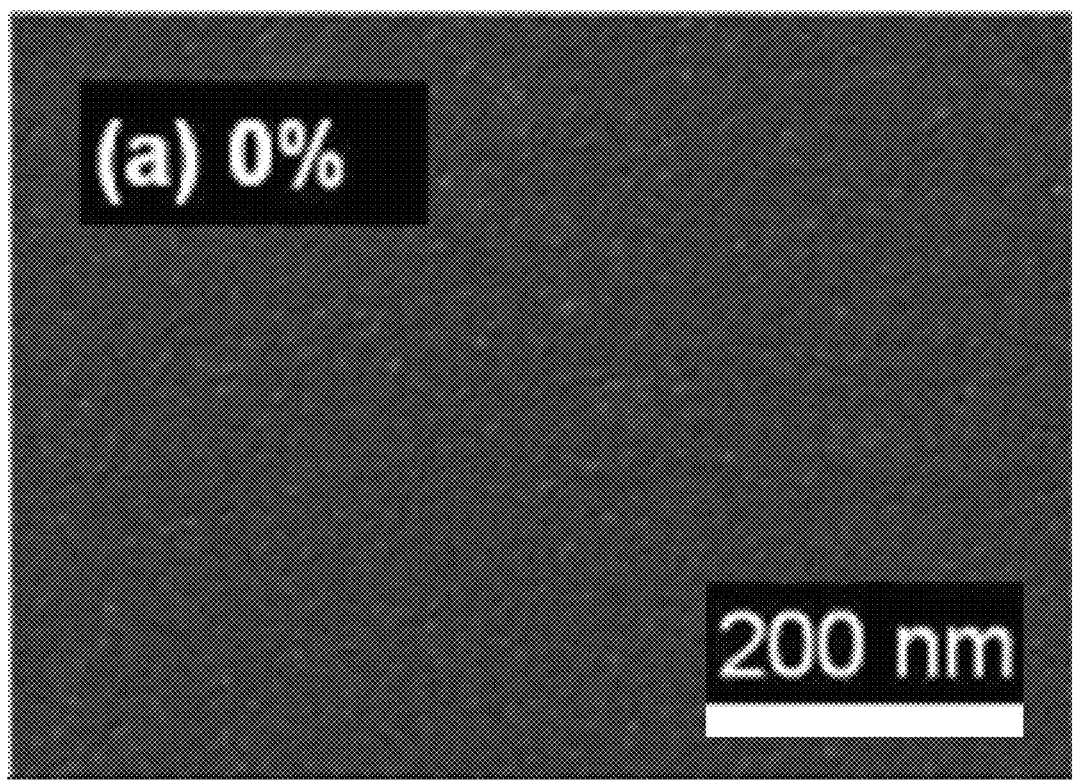
FIG. 7a is a SEM image in the case where the polyesterimide varnish in accordance with Comparative Example 1 of the present disclosure is subject to heat curing.
Figure 7B:
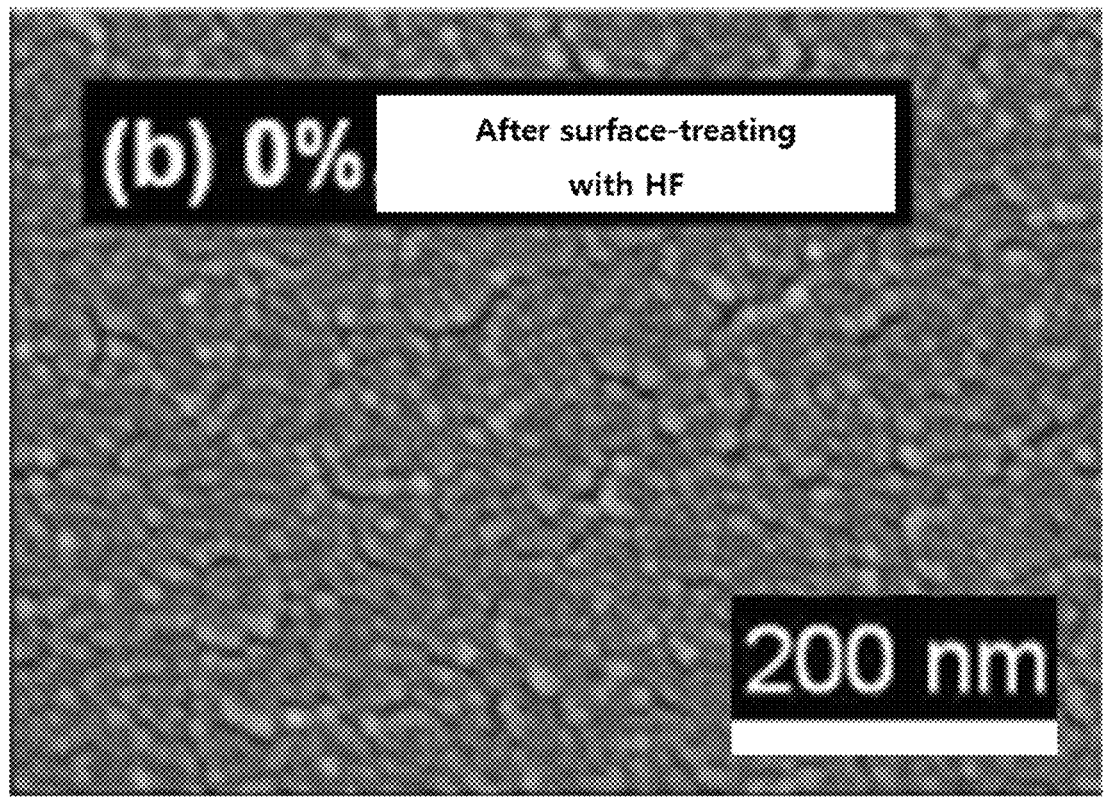
FIG. 7b is a SEM image in the case where the polyesterimide varnish in accordance with Comparative Example 1 of the present disclosure is subject to heat curing and surface-treating with a hydrofluoric acid.
Figure 7C:
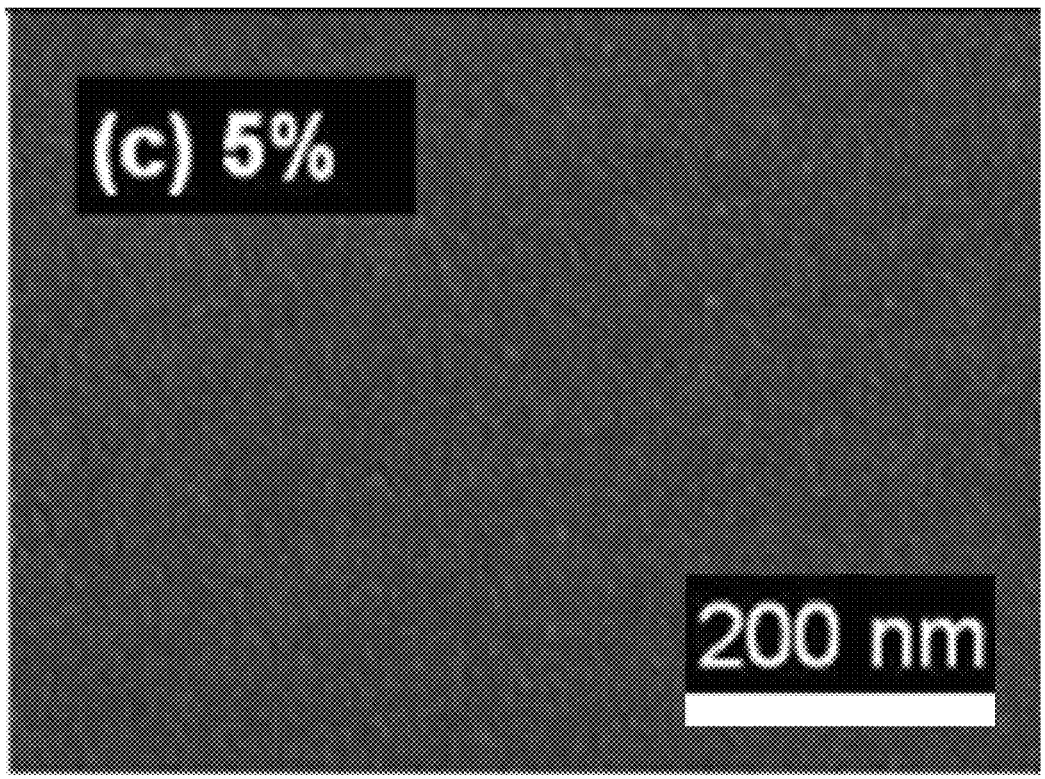
FIG. 7c is a SEM image in the case where the polyesterimide nanocomposite varnish containing 5 wt % of the multiply surface-functionalized inorganic nanofiller in accordance with Example 1 of the present disclosure is subject to heat curing.
Figure 7D:
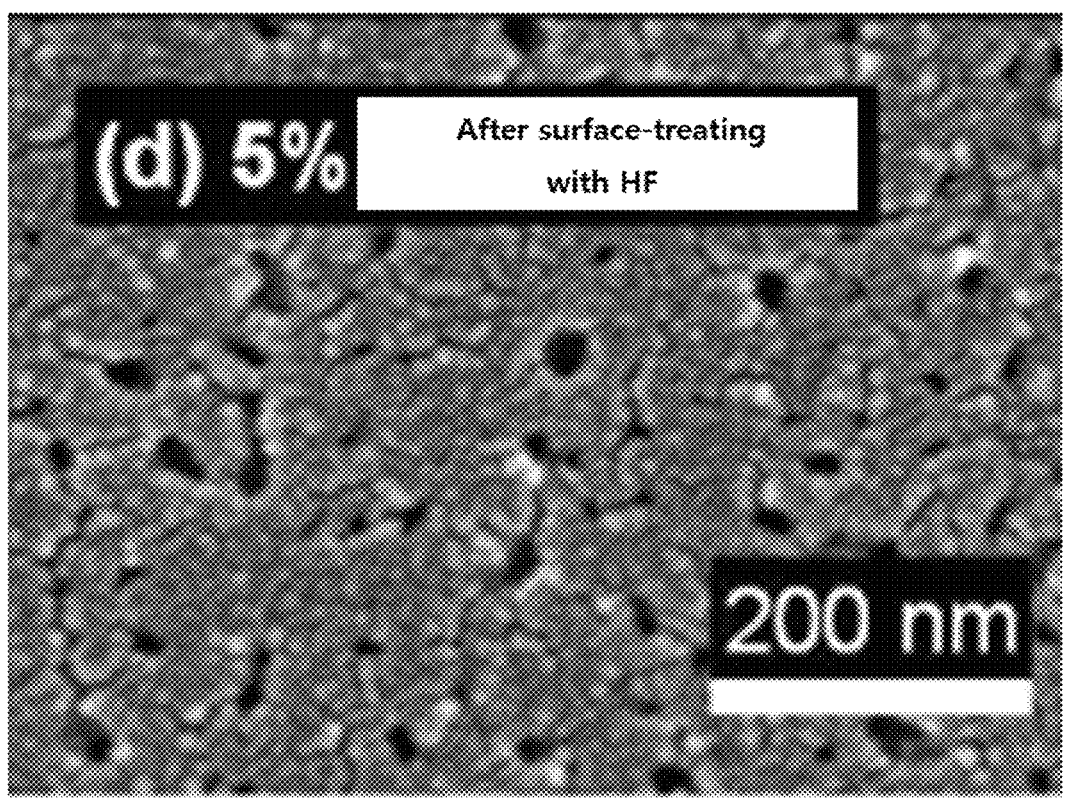
FIG. 7d is a SEM image in the case where the polyesterimide nanocomposite varnish containing 5 wt % of the multiply surface-functionalized inorganic nanofiller in accordance with Example 1 of the present disclosure is subject to heat curing and surface-treating with a hydrofluoric acid.

FIG. 7a is a SEM image in the case where the polyesterimide varnish of Comparative Example 1 was subject to heat curing. FIG. 7b is a SEM image in the case where the polyesterimide varnish of Comparative Example 1 was subject to heat curing and surface-treating with a hydrofluoric acid. FIG. 7c is a SEM image in the case where the polyesterimide nanocomposite varnish containing 5 wt % of the multiply surface-functionalized inorganic nanofiller of Example 1 was subject to heat curing. FIG. 7d is a SEM image in the case where the polyesterimide nanocomposite varnish containing 5 wt % of the multiply surface-functionalized inorganic nanofiller of Example 1 was subject to heat curing and surface-treating with a hydrofluoric acid. The hydrofluoric acid processing in FIGS. 7b and 7d was performed by immersing the varnish in from about 47% to about 51% of a hydrofluoric acid solution. The multiply surface-functionalized inorganic nanofiller was removed from the surface of the nanocomposite varnish through the hydrofluoric acid processing to the surface of the varnish so that black holes were formed. From the distribution of the holes, it was confirmed that the multiply surface-functionalized inorganic nanofillers were individually dispersed well with a nanometer scale on the surface of the varnish. That is, it was confirmed that the condensation of the inorganic nanofillers was minimized through the proper surface-treating.

Figure 8:
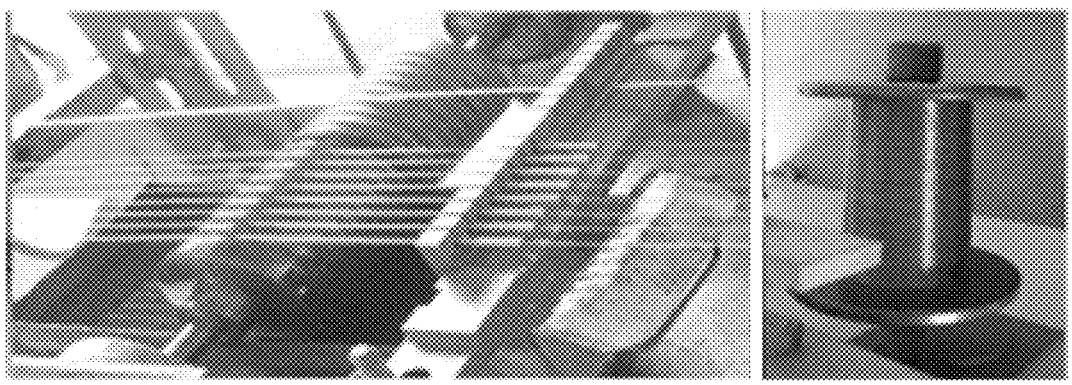
FIG. 8 is a photograph showing processes for preparing a partial discharge resistant enameled wire by coating a nanocomposite varnish on a conductive wire and performing drying and heat processing thereto so as to form a film, as parts of the processes for preparing a partial discharge resistant enameled wire in accordance with Example 1 of the present disclosure.

FIG. 8 is a photograph showing parts of processes for preparing the partial discharge resistant enameled wire in accordance with Example 1 by coating a nanocomposite varnish on a conductive wire and performing drying and heat processing thereto so as to form a film. As shown from the photograph of FIG. 8, the processes for preparing the partial discharge resistant enameled wire included coating, heat curing, and winding processes. In this case, heat processing was performed prior to coating the enameled wire so that oil on the surface of the enameled wire was burned, thereby, making the surface flexible. Subsequently, the varnish was coated on the surface of the wire. The wire passed through a vice, which had a larger inner diameter than that of the wire and was a cylindrical metal object, so that an amount of the varnish coated on the surface of the wire was uniformed. Thereafter, the wire was subject to heat processing at a high temperature. In this way, the enameled wire was coated 8 times, and then, winded on a bobbin for an enameled wire. Table 2 below shows an outer diameter and a sheath thickness of each of the enameled wires of Comparative Example 1 and Example 1.

TABLE 2

| Enameled wire | Comparative Example 1 | Example 1 (5 wt %) | Example 1 (10 wt %) |
| --- | --- | --- | --- |
| Outer diameter (mm) (maximum/minimum) | 0.556/0.562 | 0.558/0.562 | 0.561/0.562 |
| Sheath thickness (μm) | 29.5 | 30 | 30.75 |

As shown in Table 2 above, there was no significant difference in an outer diameter and a sheath thickness between the partial discharge resistant enameled wire of Example 1 and the enameled wire of Comparative Example 1.

Figure 9A:
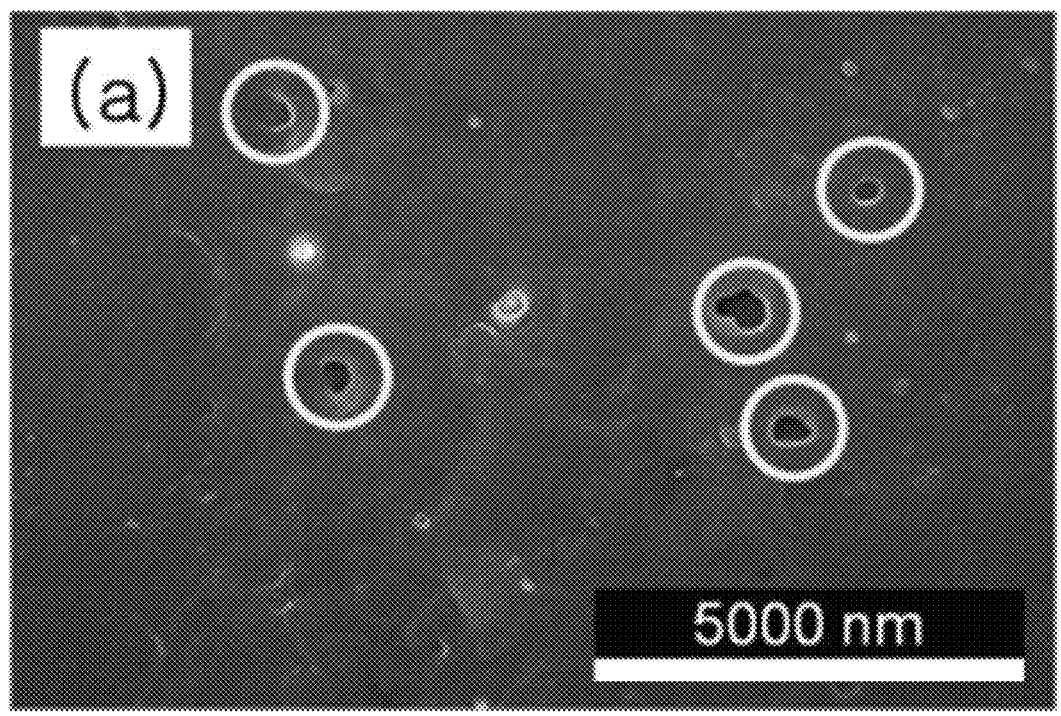
FIG. 9a is a SEM image of a surface of a polyesterimide enameled wire in accordance with Comparative Example 1 of the present disclosure.
Figure 9B:
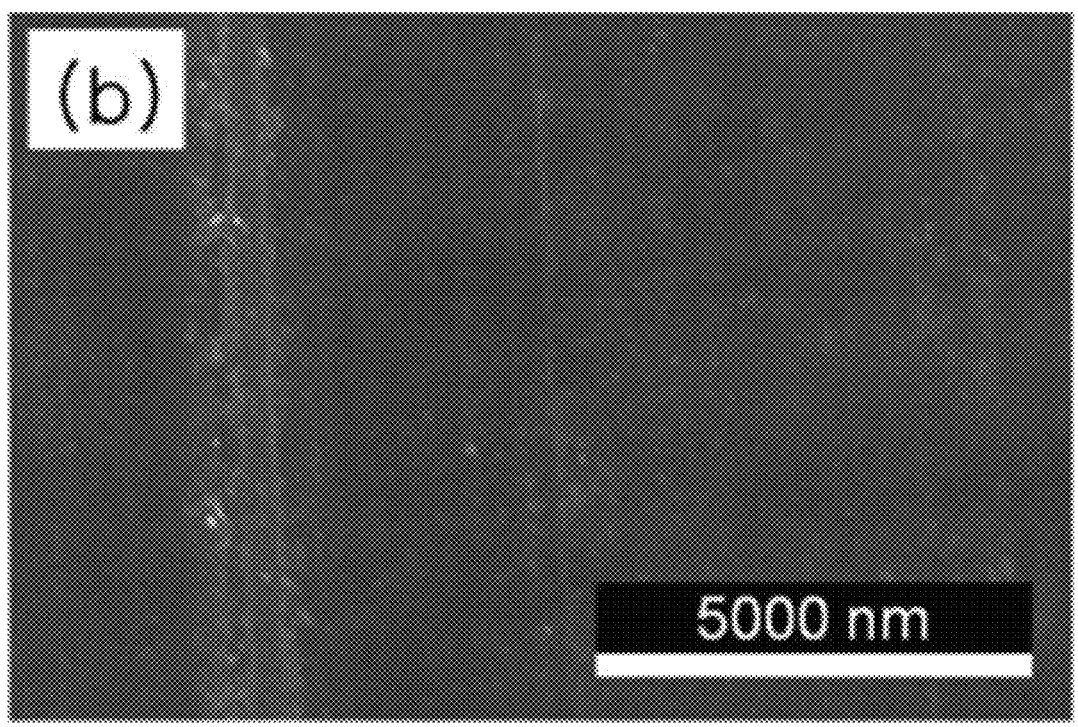
FIG. 9b is a SEM image of a surface of a polyesterimide partial discharge resistant enameled wire in accordance with Example 1 of the present disclosure.

FIG. 9a is a SEM image of a surface of the polyesterimide enameled wire of Comparative Example 1, and FIG. 9b is a SEM image of the polyesterimide partial discharge resistant enameled wire of Example 1. From FIG. 9a, it was confirmed that generation of a hole during the heat curing process in a micrometer size occurred on the surface of the polyseterimide enameled wire of Comparative Example 1 which was prepared according to a conventional technology. The hole was indicated in a white circle. However, from FIG. 9b, it was confirmed that generation of a hole did not occur on the surface of the polyesterimide partial discharge resistant enameled wire of Example 1, and the surface of the wire was in the smooth state. Among the partial discharges, the void discharge may intensively occur on the hole. Accordingly, the fact that no hole was generated suggests more improved resistance against deterioration by the partial discharge.

Figure 10:
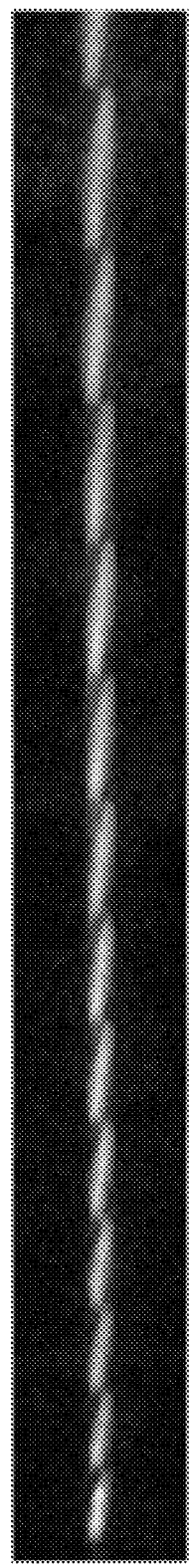
FIG. 10 is a photograph showing partial discharges occurring on a surface of the polyesterimide partial discharge resistant enameled wire in accordance with Example 1 of the present disclosure.

FIG. 10 is a photograph showing partial discharges occurring on the surface of the polyesterimide partial discharge resistant enameled wire of Example 1. The photograph was captured by a digital camera in the state that the two polyesterimide partial discharge resistant enameled wires were twisted by using the two wire twisting method described in the testing method for KS C3006 enameled copper wires and enameled aluminum wires, and a sine wave AC power supply of about 4 kV and about 10 kHz was applied to the twisted wires according to the partial discharge tests described in KS C IEC 60885-2. The partial discharge measurement machine used in FIGS. 10 and 11 was the SM-2HF10K model of Sungmin Instruments.

Figure 11:
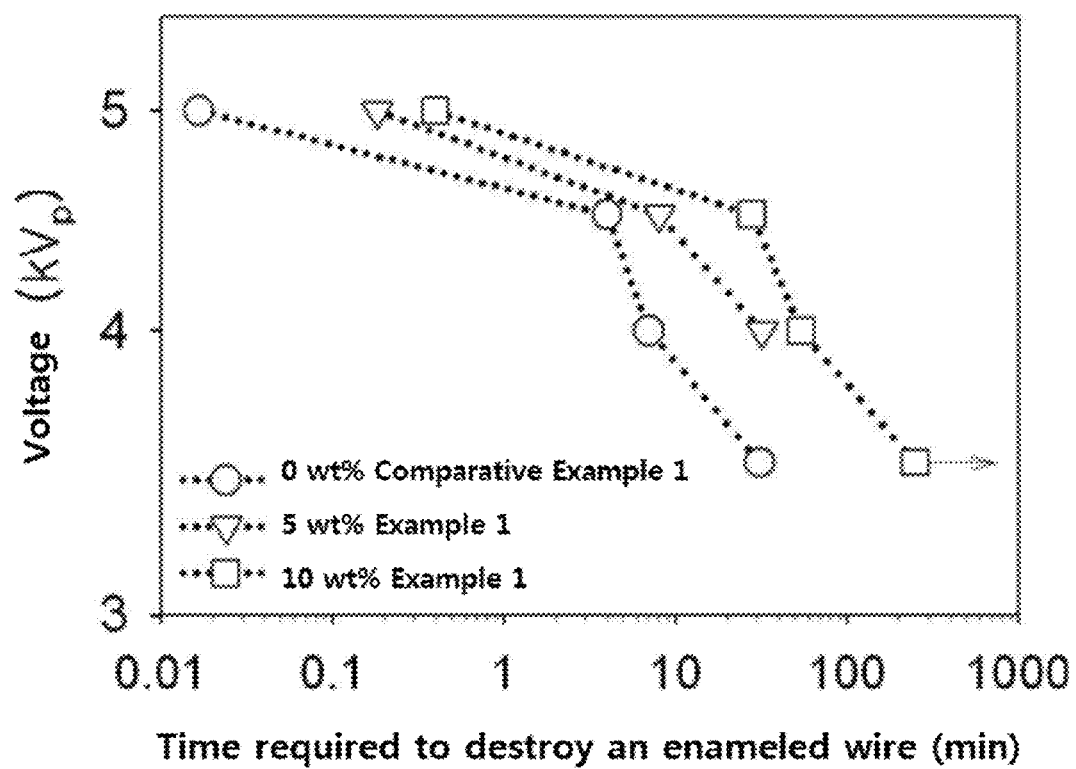
FIG. 11 is a time-voltage graph showing time required until the enameled wire in accordance with Comparative Example 1 of the present disclosure and the partial discharge resistant enameled wire in accordance with Example of the present disclosure are destroyed when partial discharges are applied thereto.

FIG. 11 is a time-voltage graph showing time and voltage required until the enameled wire of Comparative Example 1 and the partial discharge resistant enameled wire of Example 1 were destroyed when partial discharges were applied thereto. From FIG. 11, it was confirmed that the polyesterimide enameled wire of Comparative Example 1 was destroyed immediately when an about 5 kV voltage was applied, but the partial discharge resistant enameled wire containing 5 wt % of the multiply surface-functionalized inorganic nanofiller of Example 1 lasted for about 11 seconds, and the partial discharge resistant enameled wire containing 10 wt % of the inorganic nanofiller lasted for about 24 seconds. In the case where voltage of about 4.5 kV was applied, the order that the wires last was the same as described above, and times required until the enameled wires were destroyed are about 7 minutes, about 32 minutes, and about 54 minutes, respectively. In the case where voltage of about 3.5 kV was applied, the enameled wire of Comparative Example 1 lasted for about 31 minutes, and the partial discharge resistant enameled wire containing 10 wt % of the inorganic nanofiller of Example 1 lasted for more than about 250 minutes. The measurement was stopped due to limited time for testing, but the partial discharge resistant enameled wire containing 10 wt % of the inorganic nanofiller of Example 1 was expected to have lasted longer, as presented by an arrow in FIG. 11.

Figure 12:
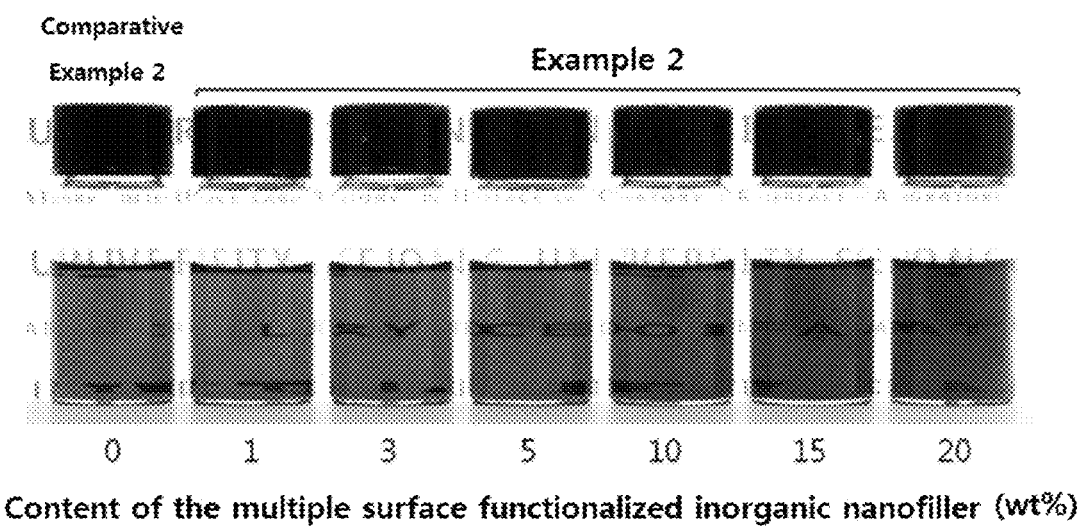
FIG. 12 is a photograph showing a polyester varnish in accordance with Comparative Example 2 of the present disclosure and a polyester nanocomposite varnish in accordance with Example 2 of the present disclosure, in which a content of the multiply surface-functionalized inorganic nanofiller is 1, 3, 5, 10, 15, and 20 wt % compared to solids.

FIG. 12 a photograph showing the polyester varnish of Comparative Example 2 and the polyester nanocomposite varnish of Example 2 in which a content of the multiply surface-functionalized inorganic nanofiller is 1, 3, 5, 10, 15, and 20 wt % compared to solids. From FIG. 12, it was confirmed that the multiply surface-functionalized inorganic nanofiller were dispersed well in the polyester varnish, thereby, having high transparency. However, as the amount of the multiply surface-functionalized inorganic nanofiller increased, the transparency was slightly reduced.

Figure 13:
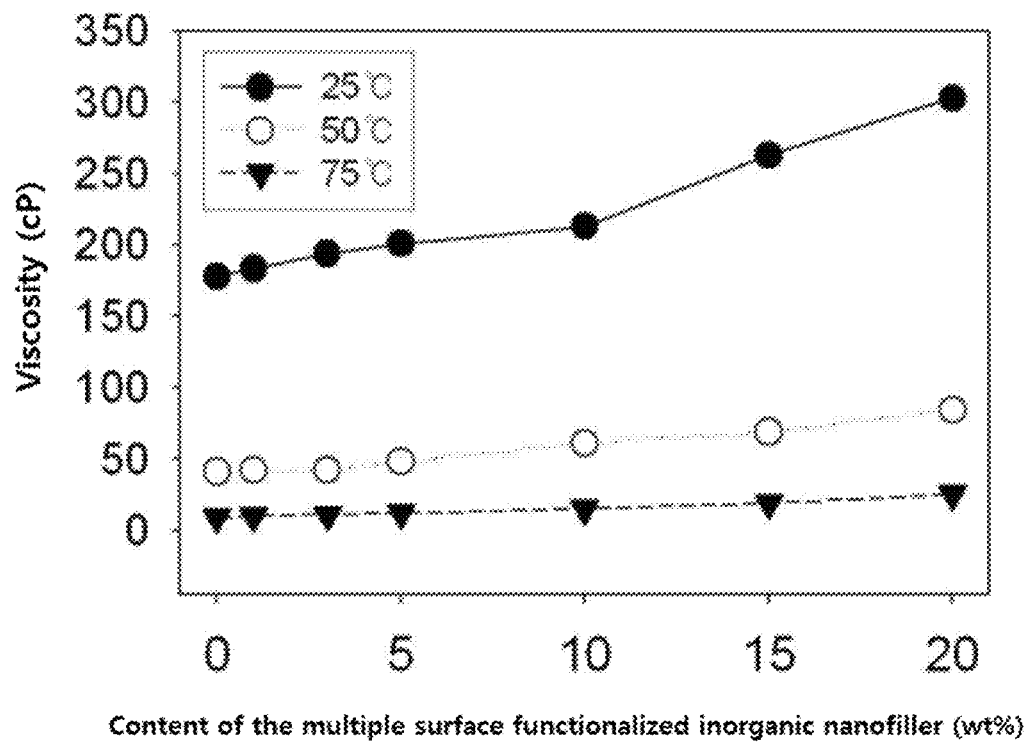
FIG. 13 is a viscosity graph for the polyester varnish in accordance with Comparative Example 2 of the present disclosure and the polyester nanocomposite varnish in accordance with Example 2 of the present disclosure, in which a content of the multiply surface-functionalized inorganic nanofiller is 1, 3, 5, 10, 15, and 20 wt % compared to solids.

FIG. 13 is a viscosity graph for the polyester varnish of Comparative Example 2 and the polyester nanocomposite varnish of Example 2 in which a content of the multiply surface-functionalized inorganic nanofiller is 1, 3, 5, 10, 15, and 20 wt % compared to solids. As shown in FIG. 13, the viscosity of the polyester varnish of Comparative Example 2 in which the content of the inorganic nanofillers was 0 wt %, was 178 cP at 25° C. The viscosity of the polyester nanocomposite varnish in accordance with Example 2, in which the content of the inorganic nanofillers was 5 wt %, was 201 cP at 25° C. In the case where the content of the inorganic nanofiller was 20 wt %, the viscosity was 303 cP at 25° C. Meanwhile, the 50° C. temperature was similar to the temperature at which the varnish was heated prior to coating the enameled wire. The viscosity of the polyester varnish of Comparative Example 2 was 41 cP at 50° C. The polyester nanocomposite varnish of Example 2 in which the content of the inorganic nanofillers was 5 wt %, exhibited the viscosity of 48 cP at 50° C. The polyester nanocomposite varnish of Example 2 in which the content of the inorganic nanofillers was 20 wt %, exhibited the viscosity of 85 cP at 50° C. Meanwhile, the viscosity at 75° C. was lower than the viscosity at 50° C. In all the cases, the viscosity was very low at 75° C., ranging 9 cP to 25 cP. In the case where the content of the multiply surface-functionalized inorganic nanofillers was less than 10 wt %, there is gradual variation of the viscosity. However, in case of the content of more than 10 wt %, the viscosity increase was relatively large.

Figure 14A:
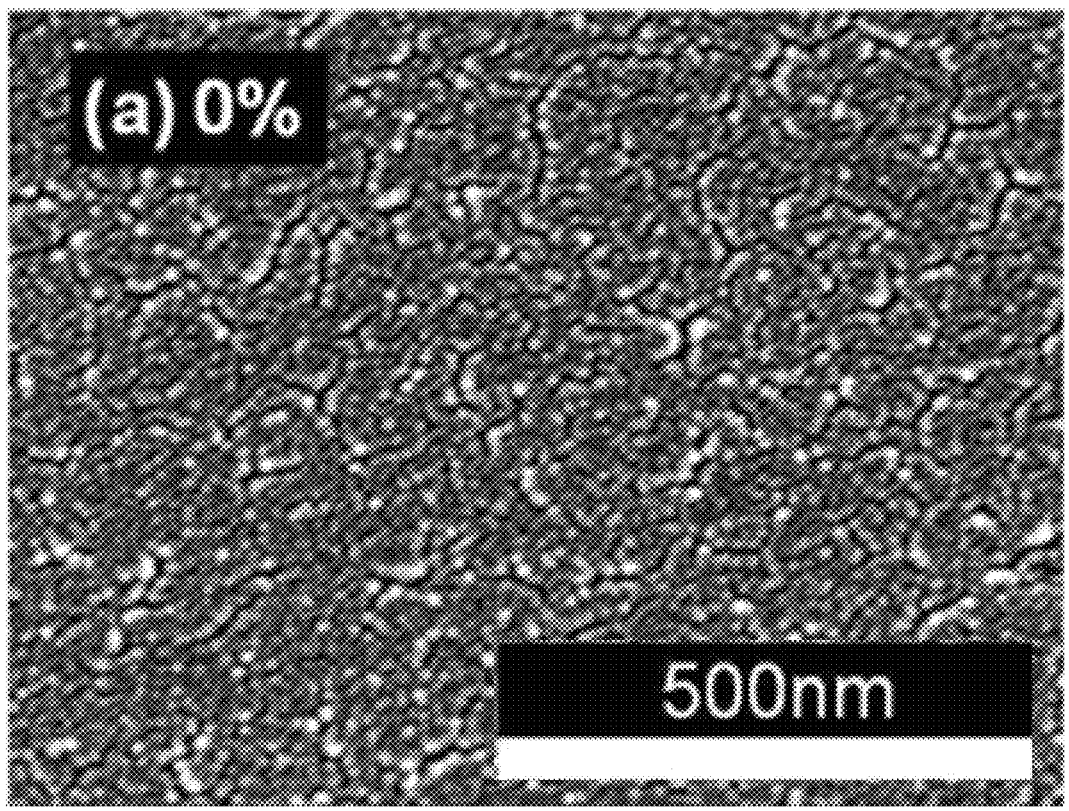
FIG. 14a is a SEM image in the case where the polyester varnish in accordance with Comparative Example 2 of the present disclosure is subject to heat curing.
Figure 14B:
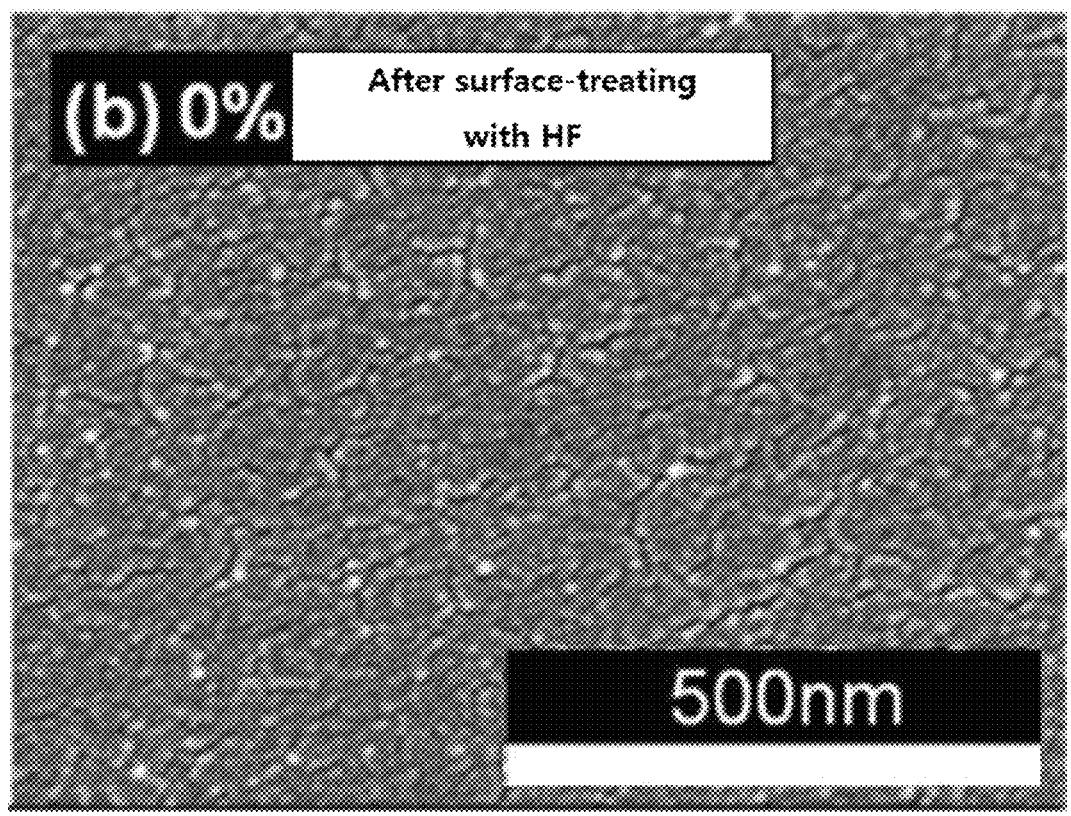
FIG. 14b is a SEM image in the case where the polyester varnish in accordance with Comparative Example 2 of the present disclosure is subject to heat curing and surface-treating with a hydrofluoric acid.
Figure 14C:
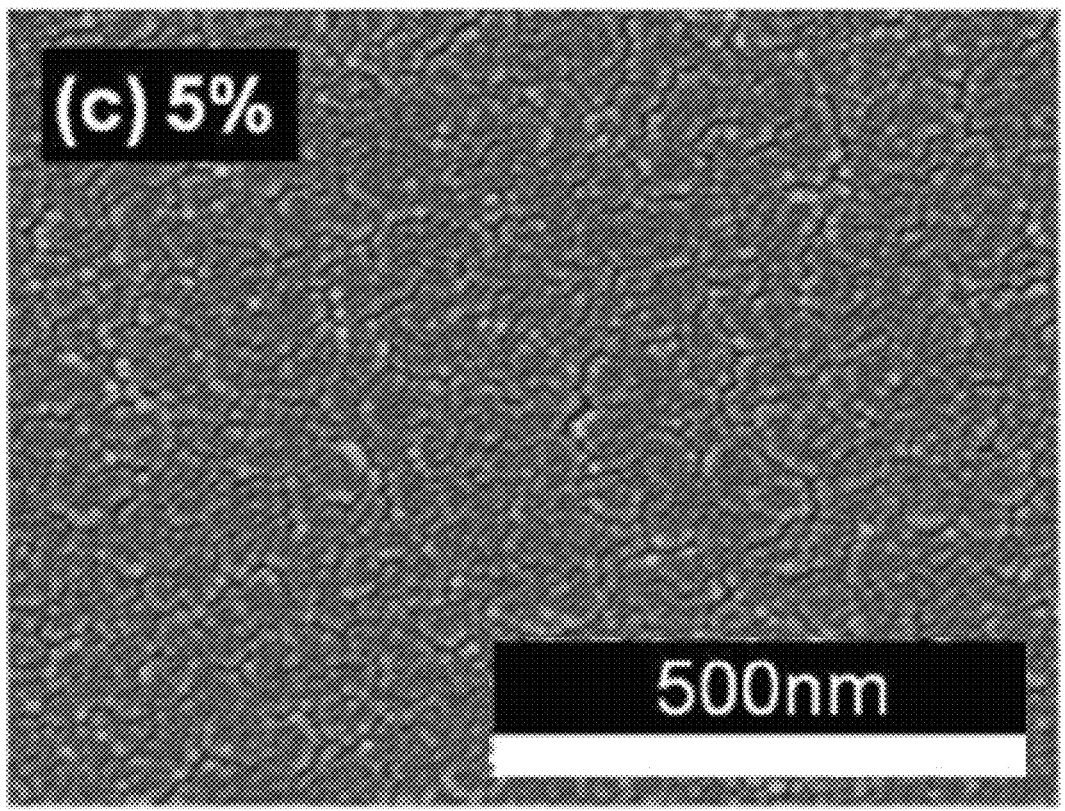
FIG. 14c is a SEM image in the case where the polyester nanocomposite varnish containing 5 wt % of the multiply surface-functionalized inorganic nanofiller in accordance with Example 2 of the present disclosure is subject to heat curing.
Figure 14D:
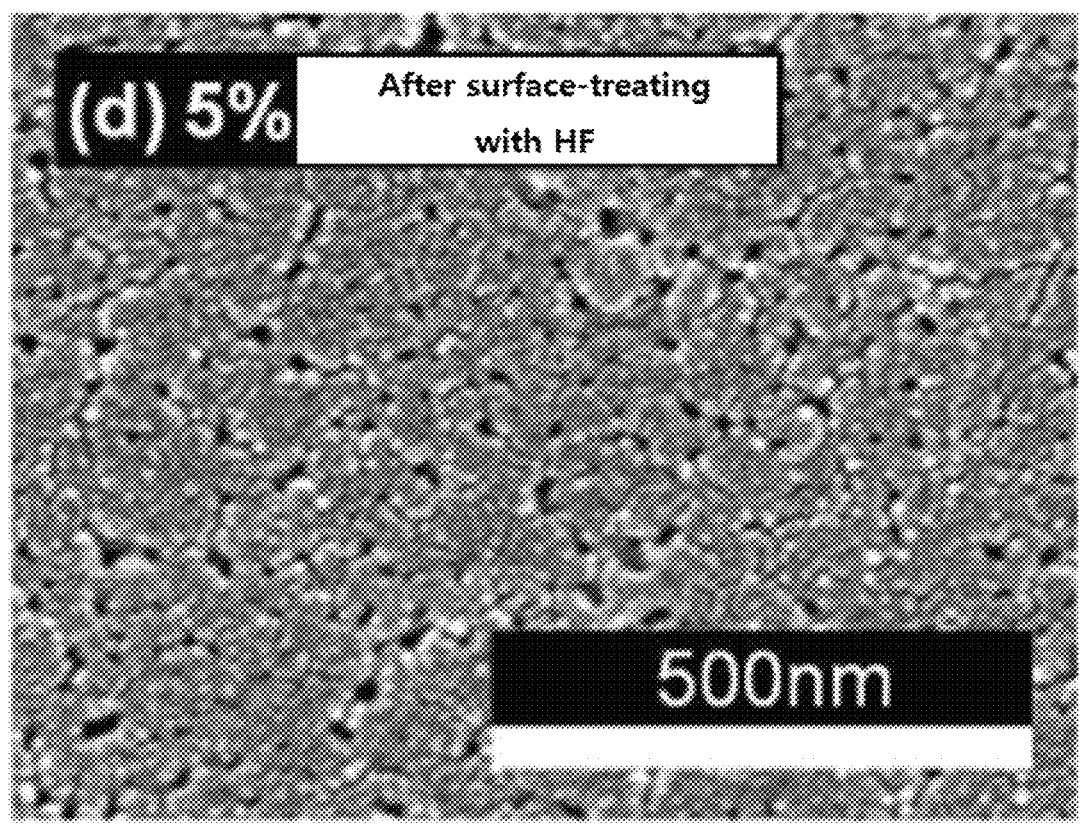
FIG. 14d is a SEM image in the case where the polyester nanocomposite varnish containing 5 wt % of the multiply surface-functionalized inorganic nanofiller in accordance with Example 2 of the present disclosure is subject to heat curing and surface-treating with a hydrofluoric acid.

FIG. 14a is a SEM image in the case where the polyester varnish of Comparative Example 2 was subject to heat curing, FIG. 14b is a SEM image in the case where the polyester varnish of Comparative Example 2 was subject to heat curing and surface-treating with a hydrofluoric acid, FIG. 14c is a SEM image in the case where the polyester nanocomposite varnish containing 5 wt % of the multiply surface-functionalized inorganic nanofiller of Example 2 was subject to heat curing, and FIG. 14d is a SEM image in the case where the polyester nanocomposite varnish containing 5 wt % of the multiply surface-functionalized inorganic nanofiller of Example 2 was subject to heat curing and surface-treating with a hydrofluoric acid. The analysis results in FIG. 14 were the same as those in FIG. 7. From FIG. 14, it was confirmed that the dispersibility of the multiply surface-functionalized inorganic nanofiller was excellent in the polyester matrix.

Figure 15:
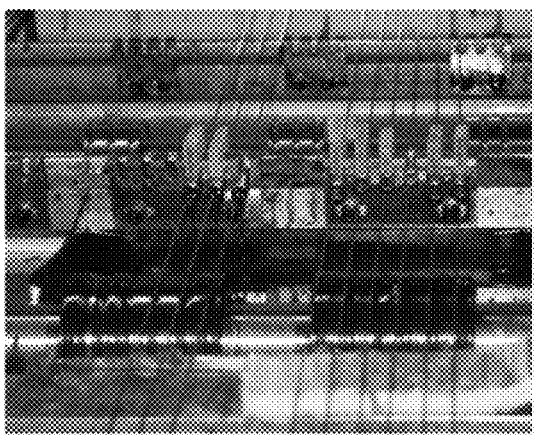
FIG. 15 is a photograph showing processes for preparing a partial discharge resistant enameled wire by coating a nanocomposite varnish on a conductive wire and performing drying and heat processing thereto so as to form a film, as parts of the processes for preparing a partial discharge resistant enameled wire in accordance with Example 2 of the present disclosure.
Figure 15:
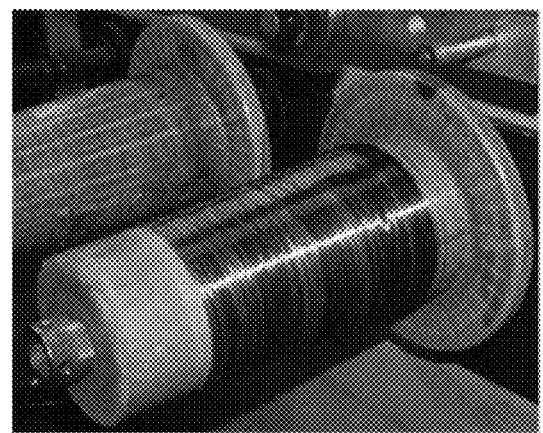

FIG. 15 is a photograph showing parts of processes for preparing the partial discharge resistant enameled wire in accordance with Example 2 by coating a nanocomposite varnish on a conductive wire and performing drying and heat processing thereto so as to form a film. Specifically, the left photograph of FIG. 15 shows coating the polyester nanocomposite varnish on the wire nine or more times. The right photograph of FIG. 15 shows winding the prepared polyester partial discharge resistant enameled wire on a bobbin for an enameled wire.

Figure 16:
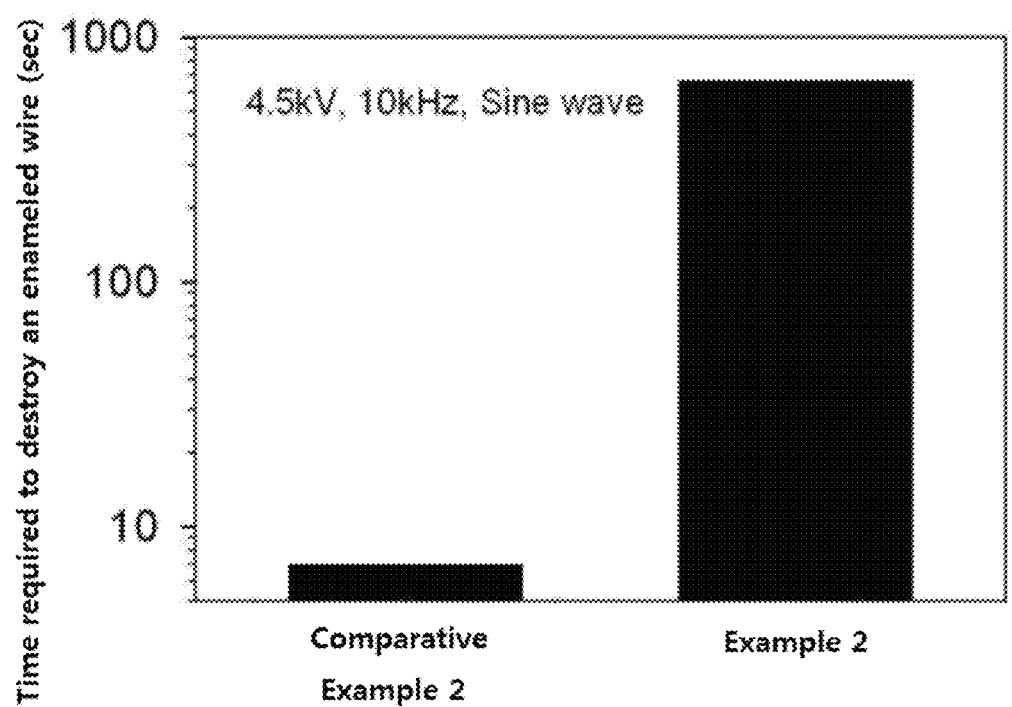
FIG. 16 is a time graph showing time required until the enameled wire in accordance with Comparative Example 2 of the present disclosure and the partial discharge resistant enameled wire in accordance with Example 2 of the present disclosure are destroyed when a partial discharge is applied thereto.

FIG. 16 is a time graph showing time required until the enameled wire of Comparative Example 2 and the partial discharge resistant enameled wire of Example 2 were destroyed when partial discharges were applied thereto. The testing conditions and processes in FIG. 16 were substantially identical to those in FIG. 11, except that an applied voltage in FIG. 16 was fixed to about 4.5 kV. In FIG. 16, time required until the enameled wire of Comparative Example 2 was destroyed was about 7 seconds. In case of the partial discharge resistant enameled wire containing about 1 wt % of the multiply surface-functionalized inorganic nanofiller of Example 2, the time was about 667 seconds. From FIG. 16, it was confirmed that the resistance against the partial discharge had been improved about 95 times.

Figure 17:
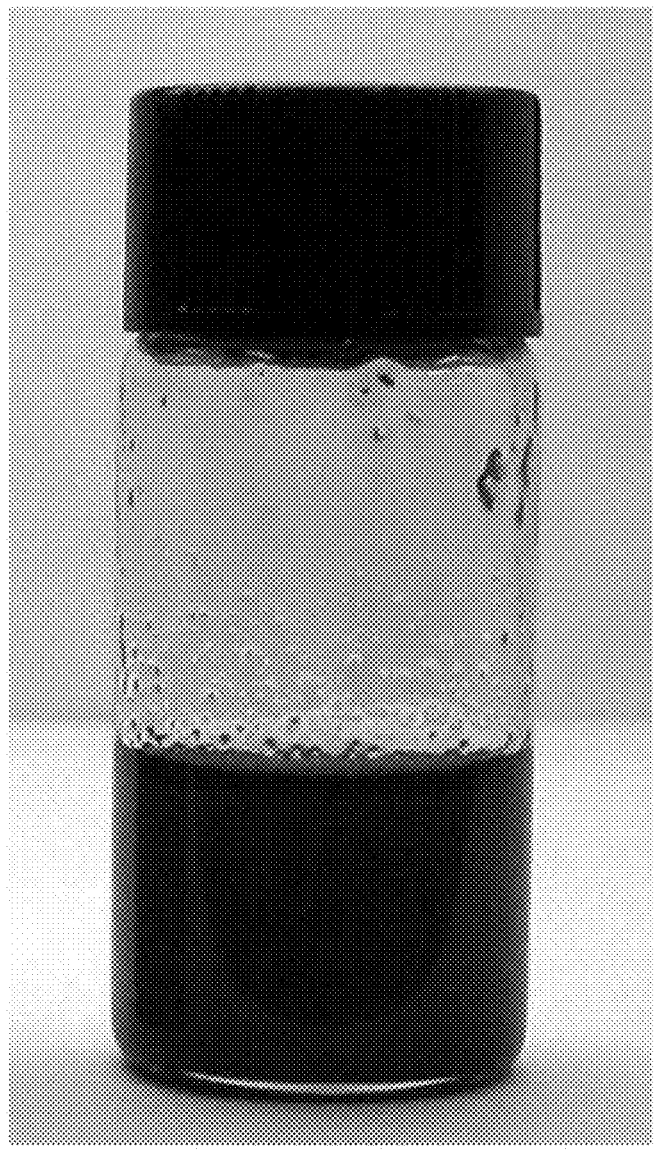
FIG. 17 is a photograph of a nanocomposite varnish containing an inorganic nanofiller, which has been surface modified using only one type of a silane, in accordance with Comparative Example 3 of the present disclosure.

FIG. 17 is a photograph of a nanocomposite varnish containing an inorganic nanofiller, which has been surface modified using only one type of a silane, in accordance with Comparative Example 3. Specifically, FIG. 17 is a photograph of a polyester nanocomposite varnish containing 1.0 wt % of the inorganic nanofiller, which had been surface modified by using only one types of a silane. It was observed that filler agglomerate was adhered to an inner wall of the glass bottle. Even though the inorganic nanofiller was primarily dispersed in a diluent, thereby, forming a colloidal solution, if the solution was dispersed again in the varnish, the solution was severely condensed again. In this case, even if an ultrasonic wave was further applied to disperse the varnish, the condensation was not homogenized. If the inorganic nanofiller was condensed in the varnish as shown in FIG. 17, the varnish cannot be used for forming a film of an enameled wire.

Figure 18:
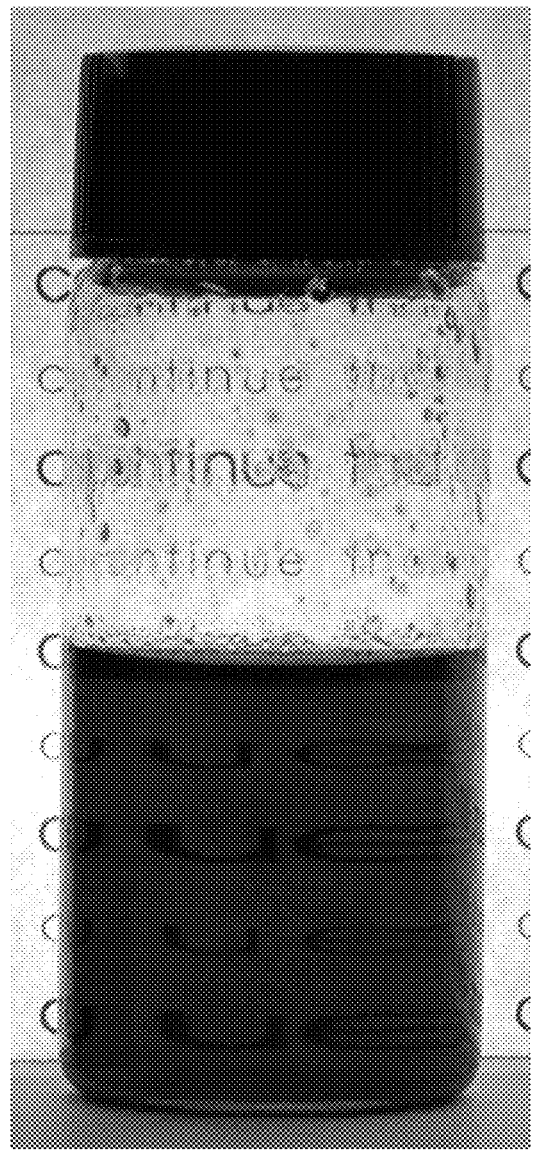
FIG. 18 is a photograph of a nanocomposite varnish containing an inorganic nanofiller in accordance with Comparative Example 4 of the present disclosure.

FIG. 18 is a photograph of a nanocomposite varnish containing the inorganic nanofiller in accordance with Comparative Example 4. Specifically, FIG. 18 is a photograph of a polyester nanocomposite varnish containing 1.0 wt % of the inorganic nanofiller, which had not been surface modified. In FIG. 18, the lower varnish appeared to be very transparent, but it was observed that the filler agglomerate is severely adhered to the inner wall of the glass bottle. It was presumed that the lower varnish appeared to be transparent because the difference in a refraction index between the inorganic nanofiller and the varnish is not significant. In this case, even if the inorganic nanofiller was primarily dispersed through the mechanically dispersing method in the manner that the inorganic nanofiller was put into a diluent, and an ultrasonic wave was applied thereto for a long time period, thereby, forming a colloidal solution, if the colloidal solution was dispersed again in the varnish, the colloidal solution was severely condensed. Even if an ultrasonic wave was further applied to disperse the solution, the agglomerate of the inorganic nanofiller formed in the varnish was not homogenized.

In sum, the multiply surface-functionalized inorganic nanofiller of the illustrative embodiment had high dispersibility in the varnish. Specifically, as the content of the multiply surface-functionalized inorganic nanofiller increases, the increase of the viscosity became gradual, and the transparency of the nanocomposite varnish was excellent. When the surface of the nanocomposite varnish was subject to the hydrofluoric acid processing, and then, the microstructure of the surface was observed, the individual dispersion of the multiply surface-functionalized inorganic nanofiller was observed. The glass transition temperature of the nanocomposite in the examples increased. Accordingly, it was confirmed that the dispersibility of the multiply surface-functionalized inorganic nanofiller was very excellent.

In conclusion, it is possible to form an enameled wire having a film containing an organic insulating polymer matrix, in which the multiply surface-functionalized inorganic nanofiller of the illustrative embodiment is dispersed. It is possible to prevent an impact from the partial discharges applied to the enameled wire through the uniformly dispersed multiply surface-functionalized inorganic nanofiller. Accordingly, if the partial discharge resistant enameled wire of the illustrative embodiment is used for an electrical device having the possibility of occurrence of a partial discharge, expansion of the life of the electrical device can be expected.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

EXPLANATION OF CODES

110: conductive wire
120: film

What is claimed is:

1. A silane-containing inorganic nanofiller, comprising:
an inorganic nanofiller;
a first silane containing at least one nitrogen-containing aromatic cyclic group which is chemically bonded to a surface of the inorganic nanofiller; and
a second silane containing at least one amine group which is chemically bonded to a surface of the inorganic nanofiller,
wherein the first silane includes a silane containing at least one nitrogen-containing aromatic cyclic group selected from the group consisting of N-[3-(trimethoxysilyl)propyl]aniline, N-[3-(trimethoxysilyl)propyl]-n'-(4-vinylbenzyl)ethylenediamine, aminophenyltrimethoxysilane and combinations thereof.

2. The silane-containing inorganic nanofiller of claim 1, wherein the silane-containing inorganic nanofiller further includes a third silane containing at least one hydrocarbon group having a number of carbon atoms of 1 to 3 which is chemically bonded to a surface of the inorganic nanofiller.

3. The silane-containing inorganic nanofiller of claim 2, wherein the third silane includes a silane containing at least one hydrocarbon group having a number of carbon atoms of 1 to 3 selected from the group consisting of ethyltrimethoxysilane, methoxytrimethylsilane, ethoxytrimethylsilane, triethylchlorosilane, trimethylchlorosilane, and combinations thereof.

4. The silane-containing inorganic nanofiller of claim 1, wherein the inorganic nanofiller includes an inorganic compound selected from the group consisting of silica, titania, alumina, zirconia, yttria, a chrome oxide, a zinc oxide, an iron oxide, clay, and combinations thereof.

5. The silane-containing inorganic nanofiller of claim 1, wherein the second silane includes a silane containing at least one amine group selected from the group consisting of 3-[2-(2-aminoethylamino)ethylamino]propyltrimethoxysilane, N-[3-(trimethoxysilyl)propyl]ethylenediamine, (3-aminopropyl)trimethoxysilane, and combinations thereof.

6. A varnish, wherein the silane-containing inorganic nanofiller of claim 1 is dispersed.

7. The varnish of claim 6, wherein the varnish includes a varnish selected from the group consisting of a polyester varnish, a polyesterimide varnish, a polyesteramide varnish, a polyesteramideimide varnish, a (tri(2-hydroxy ethyl)isocyanurate triacrylate)-polyesterimide varnish, a polyetherimide varnish, a polyamide varnish, a polyamideimide varnish, a polyimide varnish, a polyurethane varnish, a polyvinyl formal varnish, and combinations thereof.

8. An enameled wire, comprising:
a conductive wire; and
a film formed on the conductive wire, and containing an organic insulating polymeric matrix and the silane-containing inorganic nanofiller of claim 1 dispersed in the organic insulating polymeric matrix with a nanometer scale.

9. The enameled wire of claim 8, wherein the organic insulating polymeric matrix includes a polymer selected from the group consisting of polyester, polyesterimide, polyesteramide, polyesteramideimide, (tri(2-hydroxy ethyl)isocyanurate triacrylate)-polyesterimide, polyetherimide, polyamide, polyamideimide, polyimide, polyurethane, polyvinyl formal, and combinations thereof.

10. The enameled wire of claim 8, wherein the film includes from about 0.1 wt % to about 30 wt % of the silane-containing inorganic nanofiller.

11. A method for preparing the enameled wire of claim 8, comprising:
adding an inorganic nanofiller, a first silane containing at least one nitrogen-containing aromatic cyclic group, and a second silane containing at least one amine group to a first solvent followed by irradiating an ultrasonic wave to form a silane-containing inorganic nanofiller;
dispersing the silane-containing inorganic nanofiller in a second solvent to form a colloidal solution;
dispersing the colloidal solution in a varnish for an enameled wire to form a varnish containing the silane-containing inorganic nanofiller; and
coating the varnish containing the silane-containing inorganic nanofiller on a conductive wire and drying and heat curing the nanocomposite varnish coated on the conductive wire to form a film containing the silane-containing inorganic nanofiller so as to obtain the enameled wire,
wherein the first silane includes a silane containing at least one nitrogen-containing aromatic cyclic group selected from the group consisting of N-[3-(trimethoxysilyl)propyl]aniline, N-[3-(trimethoxysilyl)propyl]-n'-(4-vinylbenzyl)ethylenediamine, aminophenyltrimethoxysilane, and combinations thereof.

12. The method of claim 11, wherein adding a third silane containing at least one hydrocarbon group having a number of carbon atoms of 1 to 3 followed by irradiating an ultrasonic wave is further included to form the silane-containing inorganic nanofiller.

13. The method of claim 12, wherein the third silane includes a silane containing at least one hydrocarbon group having a number of carbon atoms of 1 to 3 selected from the group consisting of ethyltrimethoxysilane, methoxytrimethylsilane, ethoxytrimethylsilane, triethylchlorosilane, trimethylchlorosilane, and combinations thereof.

14. The method of claim 11, wherein the inorganic nanofiller includes an inorganic compound selected from the group consisting of silica, titania, alumina, zirconia, yttria, a chrome oxide, a zinc oxide, an iron oxide, clay, and combinations thereof.

15. The method of claim 11, wherein the second silane includes a silane containing at least one amine group selected from the group consisting of 3-[2-(2-aminoethylamino)ethylamino]propyltrimethoxysilane, N-[3-(trimethoxysilyl)propyl]ethylenediamine, (3-aminopropyl)trimethoxysilane, and combinations thereof.

16. The method of claim 11, wherein the varnish for the enameled wire includes a varnish selected from the group consisting of a polyester varnish, a polyesterimide varnish, a polyesteramide varnish, a polyesteramideimide varnish, a (tri(2-hydroxy ethyl)isocyanurate triacrylate)-polyesterimide varnish, a polyetherimide varnish, a polyamide varnish, a polyamideimide varnish, a polyimide varnish, a polyurethane varnish, a polyvinyl formal varnish, and combinations thereof.

* * * * *

UNITED STATES PATENT AND TRADEMARK OFFICE
CERTIFICATE OF CORRECTION

PATENT NO. : 8,927,630 B2
APPLICATION NO. : 13/530237
DATED : January 6, 2015
INVENTOR(S) : Young-Soo Seo Page 1 of 1

It is certified that error appears in the above-identified patent and that said Letters Patent is hereby corrected as shown below:

In the specification,

Column 5, line 25, please add -- 1 -- between "Example" and "of"

Column 7, line 10, please add -- 10 -- between "or" and "carbons."

Signed and Sealed this
Thirtieth Day of June, 2015

Michelle K. Lee
*Director of the United States Patent and Trademark Office*